United States Patent
Wang et al.

(10) Patent No.: US 9,732,976 B2
(45) Date of Patent: Aug. 15, 2017

(54) DIRECT POWER CONTROL FOR CONSTANT AIRFLOW CONTROL WITH ADVANCED MOTOR SYSTEM MODELING

(71) Applicant: Zhongshan Broad-Ocean Motor Co., Ltd., Zhongshan (CN)

(72) Inventors: Jizhong Wang, Bolingbrook, IL (US); Zheng Zhang, Saint Joseph, MI (US); Yiqiao Zhou, Naperville, IL (US); Yong Zhao, Zhongshan (CN)

(73) Assignee: ZHONGSHAN BROAD-OCEAN MOTOR CO., LTD. (CN)

( * ) Notice: Subject to any disclaimer, the term of this patent is extended or adjusted under 35 U.S.C. 154(b) by 425 days.

(21) Appl. No.: 14/450,962

(22) Filed: Aug. 4, 2014

(65) Prior Publication Data
US 2015/0211760 A1    Jul. 30, 2015

Related U.S. Application Data

(63) Continuation-in-part of application No. 14/375,889, filed as application No. PCT/CN2014/071723 on Jan. 28, 2014.

(51) Int. Cl.
  *F04D 27/00* (2006.01)
  *F24F 11/00* (2006.01)
  *G05B 15/02* (2006.01)

(52) U.S. Cl.
  CPC .......... *F24F 11/006* (2013.01); *F04D 27/001* (2013.01); *F04D 27/004* (2013.01); *F24F 11/0079* (2013.01); *Y02B 30/746* (2013.01)

(58) Field of Classification Search
  CPC .... F04D 27/001; F04D 27/004; F24F 11/006; F24F 11/0079; Y02B 30/746
  USPC ........................................ 700/276; 417/44.11
  See application file for complete search history.

(56) References Cited

U.S. PATENT DOCUMENTS

| | | | |
|---|---|---|---|
| 4,806,833 A | 2/1989 | Young | |
| 5,736,823 A | 4/1998 | Nordby et al. | |
| 6,611,726 B1* | 8/2003 | Crosswhite | ............. G06F 17/18 700/100 |
| 7,216,049 B2 | 5/2007 | Zhang et al. | |
| 2005/0280384 A1* | 12/2005 | Sulfstede | .............. F04D 27/004 318/432 |
| 2006/0061321 A1* | 3/2006 | Han | ..................... F24F 11/0079 318/801 |
| 2010/0256821 A1* | 10/2010 | Jeung | ..................... F24F 11/047 700/276 |

(Continued)

*Primary Examiner* — Christopher E Everett
*Assistant Examiner* — Yuhui R Pan
(74) *Attorney, Agent, or Firm* — Norton Rose Fulbright US LLP

(57) ABSTRACT

Systems and methods for providing constant airflow based on direct motor power control and advanced motor system modeling are described. A power and speed of a motor may be determined based on static pressure in the system. A target airflow rate for the system may be obtained, and a target motor power that yields the target airflow rate in the system may be determined based on the determined speed of the motor and the obtained target airflow rate for the system. A determination of whether the determined motor power is approximately equal to the target motor power may be made, and the power of the motor may be adjusted when the motor power is not approximately equal to the target motor power.

16 Claims, 19 Drawing Sheets

(56) References Cited

U.S. PATENT DOCUMENTS

| | | | | |
|---|---|---|---|---|
| 2012/0259469 | A1* | 10/2012 | Ward | G05D 23/1917 700/276 |
| 2013/0345995 | A1* | 12/2013 | Shah | G01F 1/05 702/47 |

* cited by examiner

DIRECT POWER CONTROL FOR CONSTANT AIRFLOW CONTROL WITH ADVANCED MOTOR SYSTEM MODELING

CROSS-REFERENCE TO RELATED APPLICATIONS

This application is a continuation-in-part of U.S. patent application Ser. No. 14/375,889 filed Jul. 31, 2014, which is a national stage filing of PCT/CN2014/071723 filed Jan. 28, 2014, which is hereby incorporated by reference.

TECHNICAL FIELD

The present invention relates to a method for controlling a variable speed motor to provide constant airflow. More specifically, the present invention relates to a control method for providing constant airflow with a direct power-controlled permanent magnet (PM) motor or other variable speed motor in a heating, ventilation, and air conditioning (HVAC) system.

BACKGROUND OF THE INVENTION

A PM motor refers to a direct current (DC) brushless permanent magnet synchronous motor, also known as an electronically commutated motor (ECM). Based on the application in which the motor is used, the control mode for the motor may be different. Common control modes include constant speed control, constant torque control, and constant airflow control. Constant airflow control is a common control mode for motors in HVAC systems.

In an indoor ventilation duct for a household air conditioner, the static pressure often changes with the passage of time, for example, as a result of pipe coating or filter clogging. Static pressure is often higher than the standard static pressure for the nominal system tested in the manufacturer's laboratory because pipe installations are different. Constant airflow control may provide constant airflow to users in these cases to maintain a comfortable ventilation, cooling, or heating effect under a wide range of static pressure conditions, and to make the system achieve high efficiency and energy saving.

A common control method for constant airflow requires a directly-installed air flow meter that not only increases the cost, but also increases the potential for failure because of the failure of the air flow meter. Current air-conditioning manufacturers often use a control method for constant airflow without the air flow meter. Some control methods need to monitor the variation of static pressure to adjust speed, and some calculations involve logarithmic computations or high-order polynomials, which require a microcontroller unit (MCU) of a motor controller to have powerful computational capability, which further increases the cost.

U.S. Pat. No. 4,806,833 discloses a method to change the motor speed based on the torque and the external static pressure to obtain constant air volume. To calculate the external static pressure change based on the variation of rotating speed induced by the motor's own tachometer, an airflow calculation may be obtained as a function torque and rotational speed. U.S. Pat. No. 5,736,823 also discloses a control method for constant air volume that is also a function of the torque and rotational speed.

With respect to the above-described control methods for constant airflow using torque as the key control variable, there are the following technical problems. Torque is a mechanical variable that is difficult to measure and calculate, and that will affect the precision of the control. Torque control is often used in the application of dynamic control, but constant airflow control is typically a steady state control, therefore not suited for torque control. Torque control is more complicated in motor control. Most likely, vector control is required to achieve a good torque control, but the precision of the system torque control is constrained by the cost of the system hardware and software. Torque is not a characteristic parameter by which a consumer can understand the operation of the system or for government regulation. In other words, torque is a mechanical variable that is difficult to directly measure, and using torque as a control variable to realize constant airflow control leads to complex calculations and high cost. In addition, torque is not a good characteristic by which consumers can understand system operation, nor is it a characteristic by which compliance with government regulations can be verified.

BRIEF SUMMARY OF THE INVENTION

The present invention may provide a method for constant airflow control based on direct power control of a PM motor or other variable speed motor in an HVAC system. The control method employs a concise algorithm, is especially suitable for steady-state airflow control, performs a number of central processing unit (CPU) operation requests that is not high, is low cost, has high control accuracy, and is conducive to energy saving and discharge reduction.

According to one embodiment, a method for providing constant airflow with a direct power-controlled PM motor installed in an HVAC system, wherein the motor is configured to drive the rotor rotation and have stator components, PM rotor components, and a motor controller that includes a motor operation parameters detection circuit and microprocessor, includes the following steps:

Step A) starting a motor controller;

Step B) receiving or presetting a target airflow volume value IN-CFM;

Step C) obtaining a function $P=f(n)$ according to the target airflow value IN-CFM, where n is speed and P is the input power of the PM motor;

Step D) entering a direct power control mode for constant airflow control, wherein the motor is controlled so that the motor speed starts at zero and increases along the control path specified by the function $P=f(n)$ to reach a stable working point (pt, nt), wherein Pt, nt are located on the input power and speed pair trajectory specified by the constant airflow control function $P=f(n)$;

Step E) maintaining the direct power control mode for constant airflow control according to the motor operation parameters comprising Pi, wherein Pi is the calculated real-time input power;

Step F) computing a power increment value $\Delta P$, wherein if the power increment value $\Delta P$ is less than a set value Pset, then the current working point is maintained;

Step G) if the power increment value $\Delta P$ is greater than or equal to the set value Pset, then power and speed control logic is executed to calculate a speed loop operating time to be reached, wherein if the operating time of the speed loop is not reached, then the current working point is maintained; and Step H) if the speed loop operating time is reached, then speed control circuitry is entered according to a regulated speed ni, which is the real-time speed of the motor, to realize a new working point on the input power and speed pair trajectory (Pi, ni), wherein Pt equals Pi, nt equals ni, and operation returns to step D).

According to another embodiment, the above-mentioned motor operation parameter detection circuit includes a bus current detection circuit and a bus voltage detection circuit to detect a real-time bus current $I_{bus}$ and a real-time bus voltage $V_{bus}$, wherein the motor real-time input power is $Pi=I_{bus} \cdot V_{bus}$, and wherein the real-time bus current $I_{bus}$ and a real-time bus voltage $V_{bus}$ are input to a microprocessor.

According to another embodiment, the above-mentioned motor operation parameter detection circuit includes a phase line current detection circuit and a bus voltage detection circuit to detect real-time phase currents, $I_\alpha$, and $I_\beta$, and real-time bus voltages, $V_\alpha$ and $V_\beta$, in an $\alpha$-$\beta$ coordinate system, wherein the motor real-time input power is $P_i=3/2 (V_\alpha \cdot I_\alpha + V_\beta \cdot I_\beta)$, and wherein the real-time phase currents, $I_\alpha$ and $I_\beta$, and real-time bus voltages, $V_\alpha$ and $V_\beta$, are input to a microprocessor.

According to another embodiment, the above-described function of $P=f(n)$ is obtained by collecting original data for a plurality of target air volumes by adjusting the static pressure from low static pressure to high static pressure. The range of static pressures may span the actual static pressure range experienced by the motor, and while the static pressure is adjusted the motor speed n and real-time input power Pi may be adjusted to keep airflow at a target air volume. The motor speed n and corresponding real-time input power Pi may be recorded for a plurality of target air volumes to produce a plurality of original data pairs of real-time input power Pi and speed n for the motor. In addition, a function $P=f(n)$ may be determined for a plurality of target airflow values by curve fitting the corresponding recorded original data pairs of real-time input power Pi and speed n of the motor for the target airflow.

According to another embodiment, if the external input target airflow value IN-CFM is not approximately equal to one of the determined target airflow functions $P=f(n)$, then interpolation fitting may be used to calculate a new function $P=f(n)$ corresponding to the external input target airflow value IN-CFM, wherein the new function $P=f(n)$ used to perform the constant airflow control.

According to another embodiment, the above-mentioned motor real-time input power Pi, the real-time bus current $I_{bus}$, and the real-time bus voltage $V_{bus}$, may be low-pass filtered using a digital low-pass filter.

According to another embodiment, the above mentioned function relation formula $P=f(n)$ is a polynomial function: $P=C_m n^{m-1} + \ldots + C_2 n + C_1$, where $C_1, C_2, \ldots,$ and $C_m$ are the coefficients and n is the motor speed value, and wherein each target airflow corresponding to a set of coefficients $C_1, C_2, \ldots,$ and $C_m$ is stored, and wherein the microprocessor obtains the corresponding set of coefficients $C_1, C_2, \ldots,$ and $C_m$ based on the input target airflow value IN-CFM and one of a look-up table that includes the determined target airflow functions $P=f(n)$ and the new function $P=f(n)$ calculated using the interpolation fitting.

According to another embodiment, the above-mentioned function relation formula $P=f(n)$ is a quadratic function: $P=C_3 n^2 + C_2 n + C_1$.

According to another embodiment, an HVAC system configured to perform a method for providing constant airflow includes a PM motor and a fan wheel, wherein the PM motor drives the rotation of the fan wheel, has a stator assembly, PM rotor assembly, and a motor controller, and wherein the PM motor is direct power-controlled and configured to produce constant airflow.

According to another embodiment, an HVAC system configured to perform a method for providing constant airflow includes a variable speed motor and a fan wheel, wherein the variable speed motor drives the rotation of the fan wheel, has a stator assembly, rotor assembly, and a motor controller, and wherein the variable speed motor is direct power-controlled and configured to produce constant airflow.

Compared to existing technology, the present invention has the following effects: 1) experimental methods may be used to obtain the function $P=f(n)$ corresponding to the plurality of input target air flow values $CFM_{set}$; 2) adjusting the motor input power to be equal to a target motor input power value Pt that is calculated based on the motor speed n using a function $P=f(n)$; 3) testing real-time DC bus current $I_{bus}$ or phase current and real-time bus voltage $V_{bus}$, and converting the current to currents $I_\alpha$ and $I_\beta$ on vector $\alpha$-$\beta$ coordinates and converting the voltage to the voltages $V_\alpha$ and $V_\beta$ on vector $\alpha$-$\beta$ coordinates; 4) calculating the motor real-time input power Pi, and comparing Pi to the calculated target motor input power value Pt to perform closed loop control (as an example, closed loop control may be used to provide high precision and low cost steady state constant airflow control); and 5) processing motor real-time input power Pi with a digital low-pass filter to provide more accurate and low cost calculations.

According to embodiments of the disclosure, the control parameter of the motor by which constant airflow may be provided may be the motor's direct input power. The motor input power is an electrical variable that is easily measured and accurate. In some embodiments, motor input power may be precisely obtained via the DC bus voltage on an inverter coupled to the motor and either the DC bus current on an inverter coupled to the motor or the phase currents of the motor. According to embodiments of the disclosure, direct power control of a motor is well-suited for steady state system control applications, such as constant airflow control. In addition, controlling a motor system with direct power control as disclosed herein allows for more accurate and stable control. In some embodiments, direct power control may be implemented with high precision and low cost via control of the motor's speed.

DETAILED DESCRIPTION OF THE INVENTION

Figure 1:
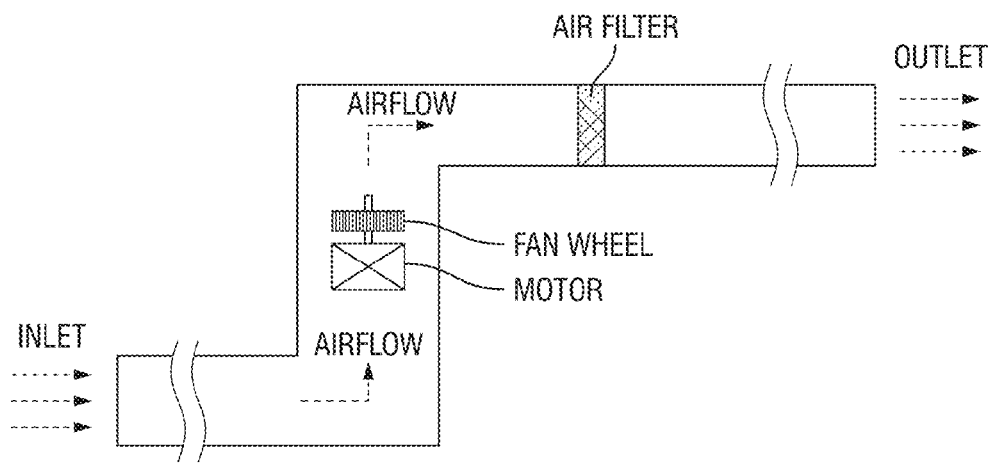
FIG. 1 is a schematic diagram illustrating a traditional air-conditioning fan system structure.

This invention is described for further detail through examples combined with the appended drawings. One embodiment of the present invention is shown in FIG. 1, in which a typical air conditioning ventilating duct installed in a blower system (e.g., gas furnace or air processor) includes a motor, fan wheel, and an air filter within the pipe. When the motor first starts, air begins to flow. However, because the number of outlets and inlet relates to the number of rooms, the design of the pipeline does not have a uniform standard. A filter may also have different pressure drops at the same time. Consequently, a blower system fitted with the traditional single-phase AC motor, such as a PSC motor, has actual airflow that is different than airflow in different pipeline systems.

Figure 2:
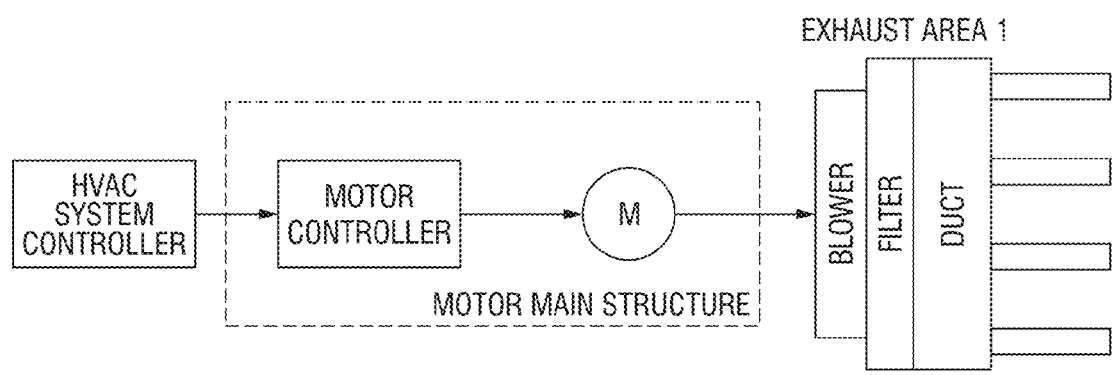
FIG. 2 is a schematic block diagram illustrating a PM motor and installation of the PM motor according to one embodiment of the disclosure.

As shown in FIG. 2, 1) a system includes an HVAC controller that controls operating devices of the system. Information may be sent to the PM motor controller through a peripheral circuit with a custom interface and protocol.

2) The motor controller includes a microprocessor, which may be a single chip or DSP electronic board conducting motor control. Part of the power source provides power to each circuit that is part of the controller, and the power source sets up a DC bus voltage and current. Therefore, the motor control will conduct power transmission. The motor controller that is made with low costs and mass production usually uses a parallel resistance circuit as current and voltage sensing hardware, and a feedback system to control the motor drive carrying out motor control, such as vector control, direct torque control, and other types of sensor based or sensorless controls. As is known to those skilled in the art, the variation of any electronic component's operating parameters impacts testing accuracy and durability.

3) The PM motor rotor includes a magnet body and structure, and multiphase windings at the stator slots. When the temperature changes, the resistance of the windings will change, which may lead to a variation in motor control. Motor manufacturing processes often also create some variation to a certain degree. The aging of the motor and whether the motor is a new motor or an old motor are also contributing factors that affect accuracy and durability, such as the lifespan of the motor. Moreover, the magnet or the magnetic flux of the motor may be affected by temperature changes, demagnetization, etc. In addition, the motor shaft failure, the security of the system, and the detection or real-time monitoring of parameters is also impacted by temperature changes and variation.

4) The blower is installed on the motor shaft, and causes air to flow at a certain speed. Installation position may affect the operation, may increase the friction, cause low flow, or even cause rotation in a wrong direction.

5) The filter should be replaced and receive maintenance service periodically. But this can be forgotten over a long period of time tracking, which can increase the friction and impact the air pressure.

6) Pipeline control: pipeline system may change due to dust, a broken duct, regional control, and on/off wind port system pressure changes. A system performing constant airflow control may have a lot of unstable factors as a result of the foregoing pipeline system changes.

Figure 3:
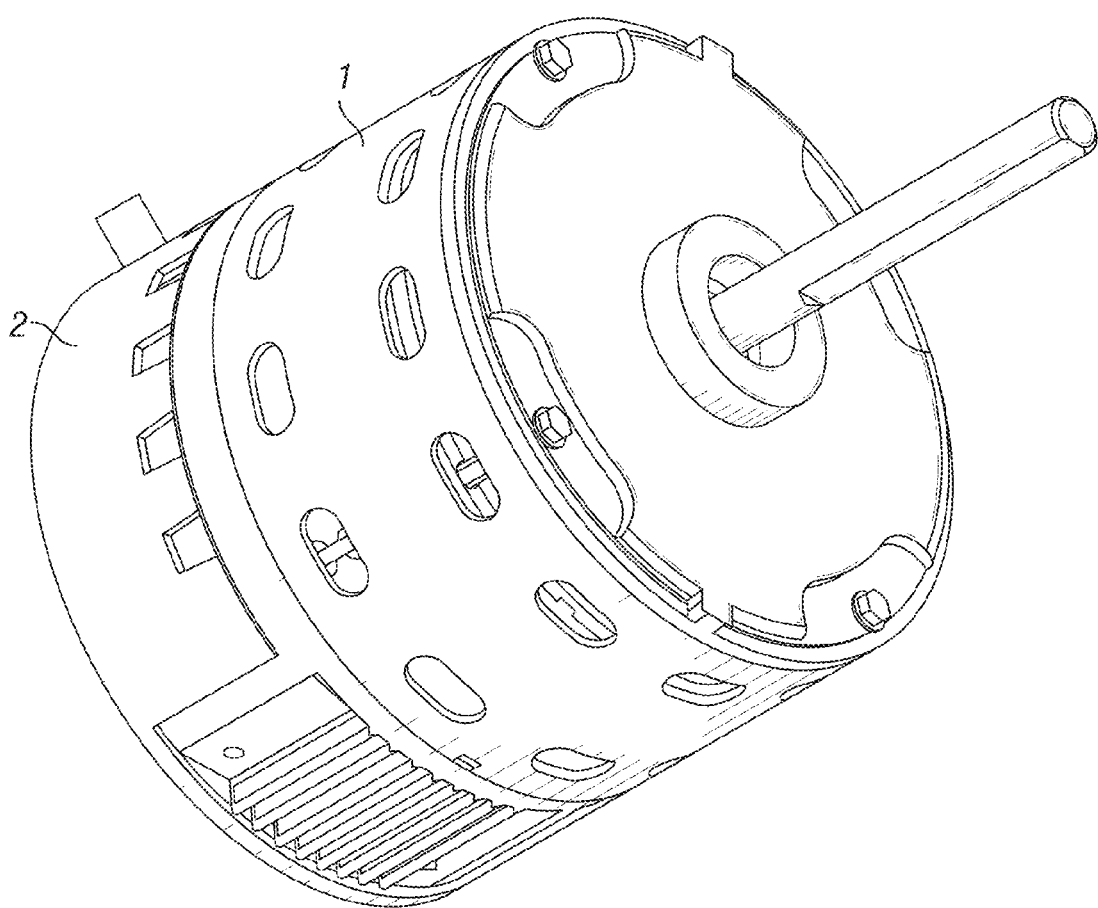
FIG. 3 is an illustration showing a stereogram of the PM motor according to one embodiment of the disclosure.
Figure 4:
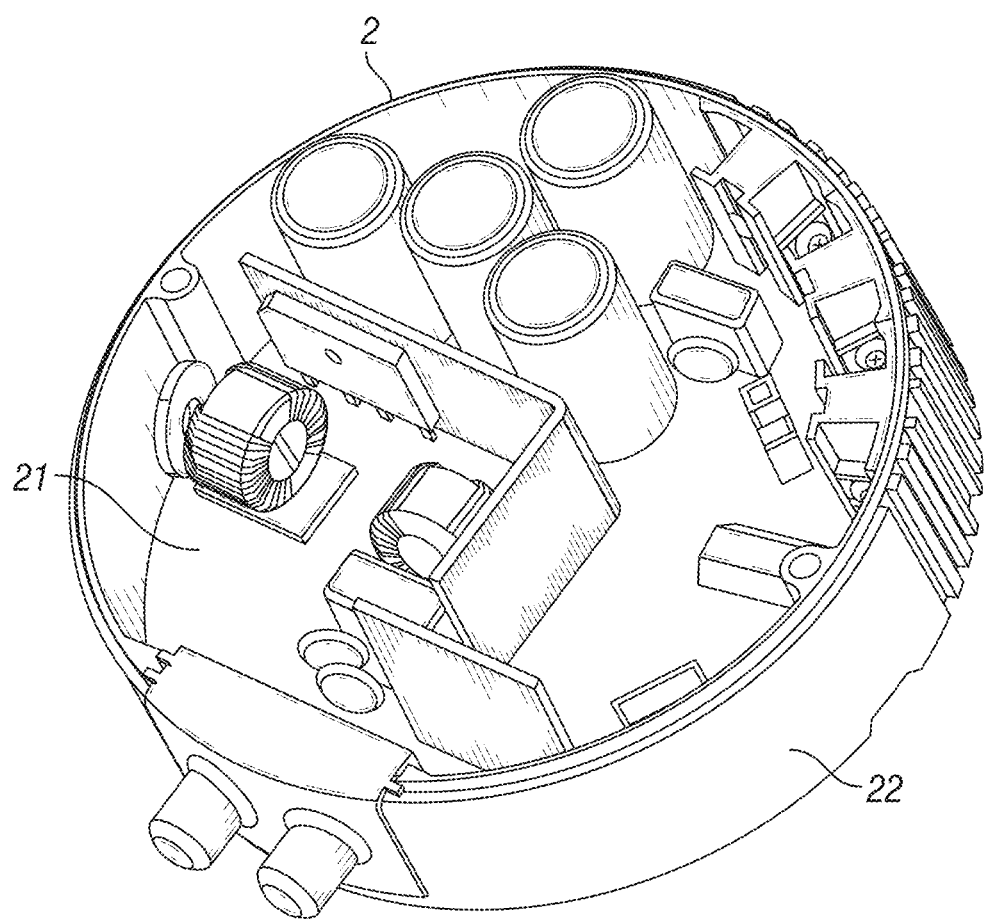
FIG. 4 is an illustration showing the motor controller stereogram of the PM motor according to one embodiment of the disclosure.
Figure 5:
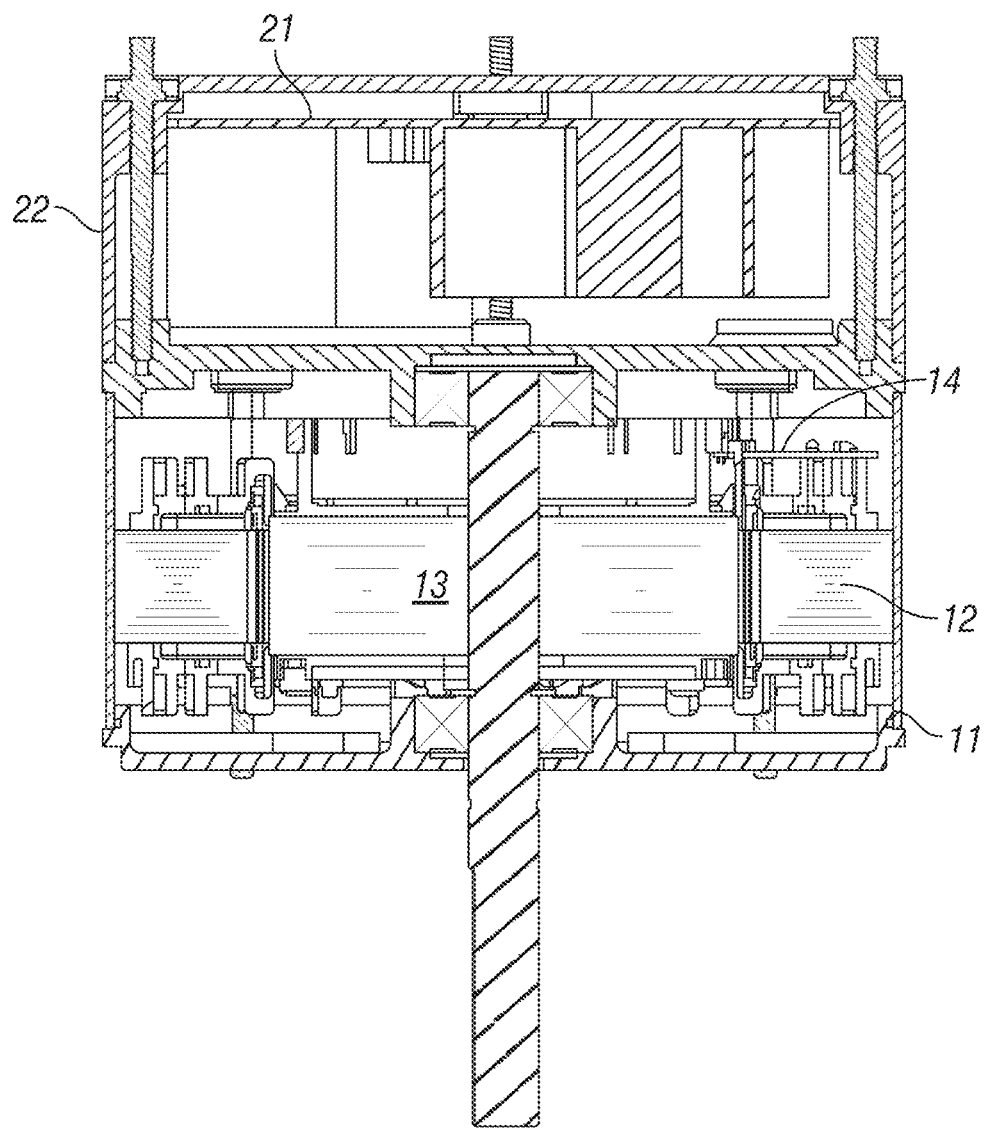
FIG. 5 is an illustration showing the sectional view of the PM motor according to one embodiment of the disclosure.

As shown in FIG. 3, FIG. 4, and FIG. 5, a PM motor usually includes a motor controller 2 and a motor main structure, wherein the motor main structure 1 includes stator components 12, rotor components 13, and housing components 11. The stator components 12 may be installed on the housing components 11. The motor main structure 1 also includes a hall sensor 14 for detecting rotor position. The rotor components 13 may be located on the inside or outside of stator 12. In some embodiments, motor controller 2 may include the control box 22 and control PCB 21, which may be installed inside the control box 22. The control circuit board may generally include a power circuit, microprocessor, DC bus current sensing circuit, inverter circuit, and a rotor position sensing circuit (14) (i.e., the hall sensors). The power circuit may supply power to each part of the circuit, and the rotor position sensing circuit may test a rotor position signal and input the result to a microprocessor. In some embodiments, the inverter DC bus current sensing circuit may input DC bus current to the microprocessor, and the DC bus voltage sensing circuit may input a DC bus voltage to the microprocessor, wherein the microprocessor controls the inverter circuit, inverter circuit control power on/off, and each winding of the stator component 12.

EXAMPLE 1

Figure 6:
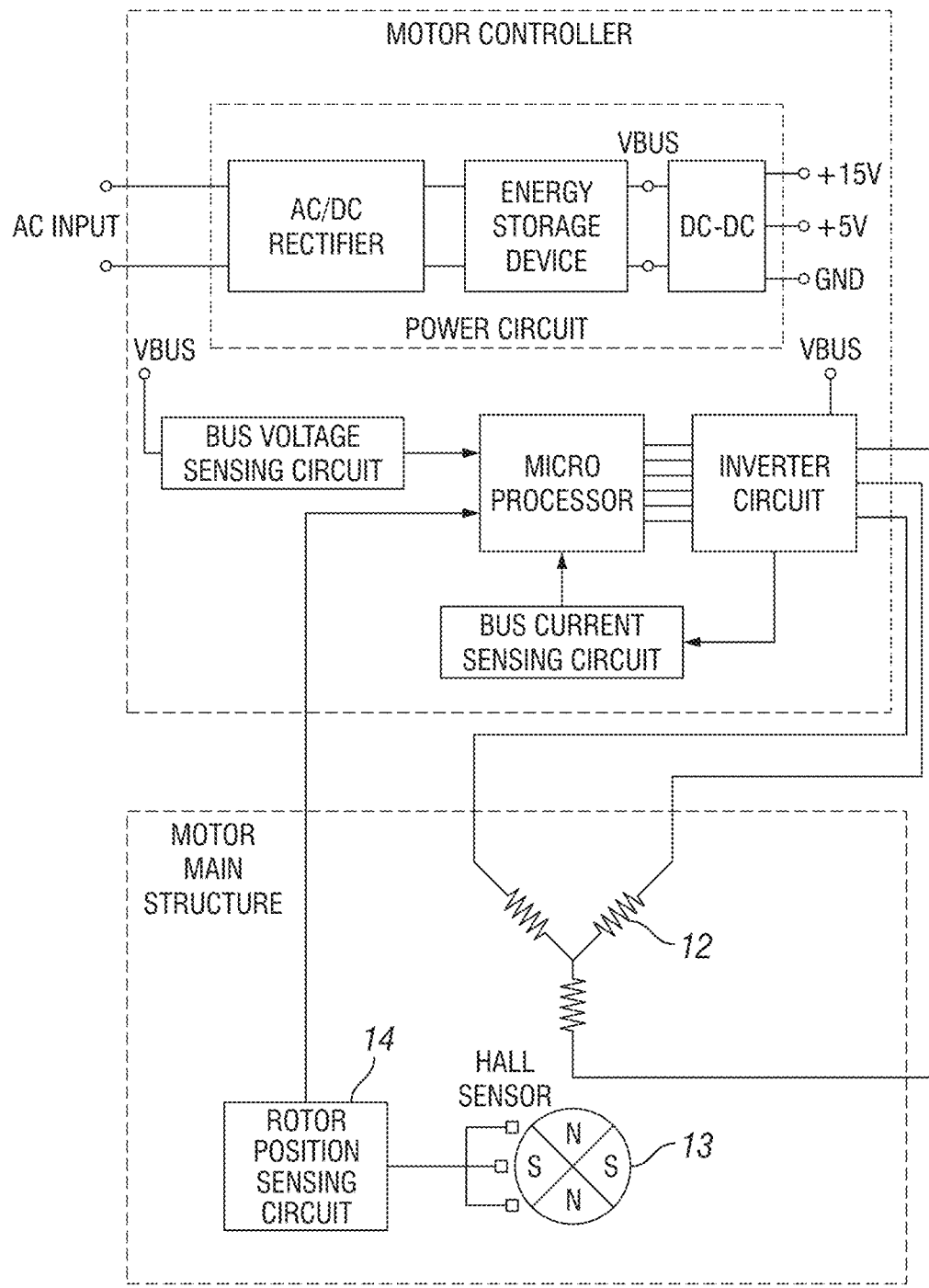
FIG. 6 is a circuit block diagram of the motor controller of a PM motor according to one embodiment of the disclosure.
Figure 7:
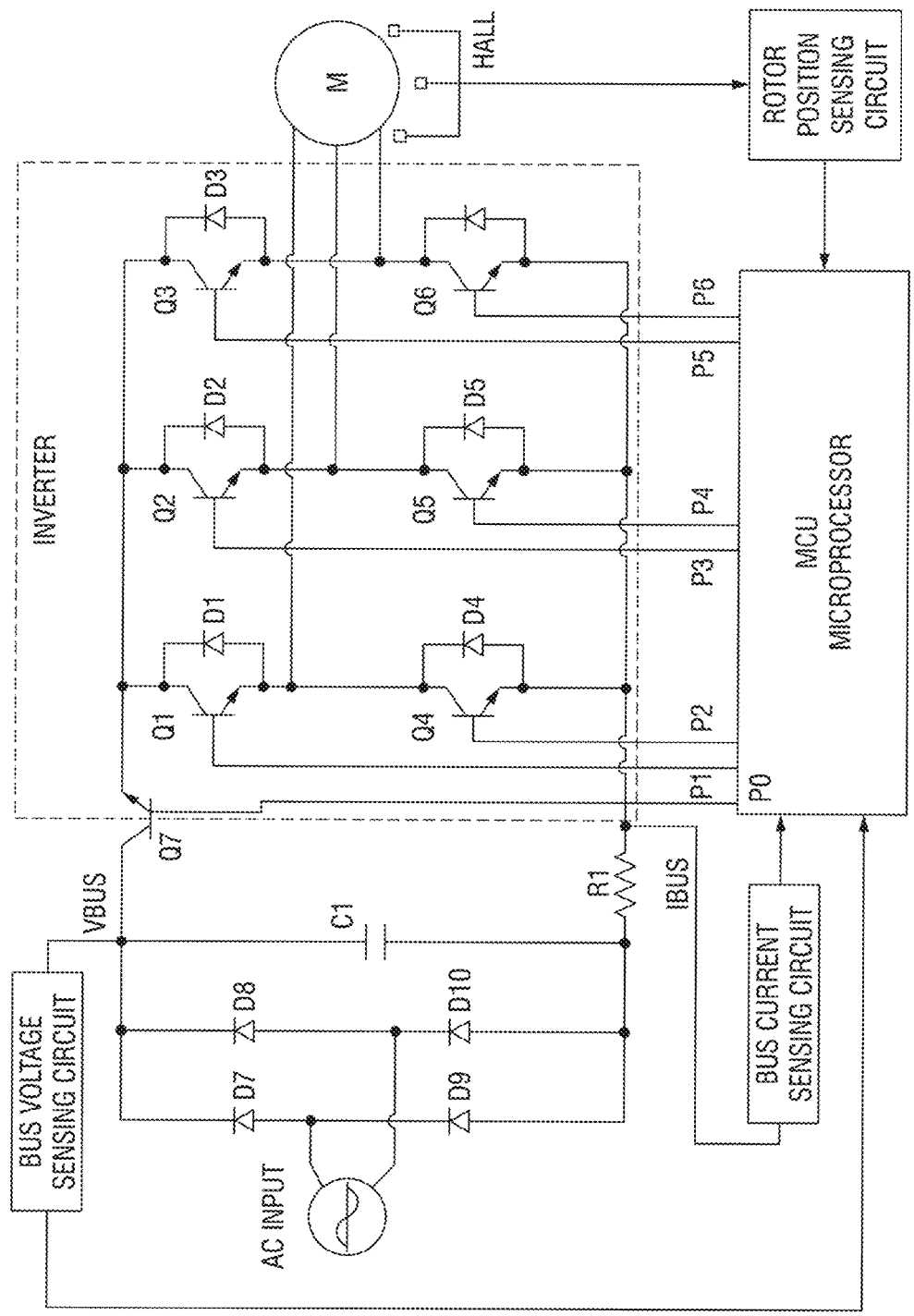
FIG. 7 is another circuit block diagram of the motor controller of a PM motor according to one embodiment of the disclosure.

As shown in FIGS. 6-7, assuming that the PM brushless DC motor is a three-phase PM synchronous motor, rotor position sensing circuit 14 may use three hall sensors to detect a rotor position of a 360° electrical cycle. AC INPUT passes through a full-wave rectifier circuit consisting of the diodes D7, D8, D9, and D10, and the DC bus voltage $V_{bus}$ is output at one end of capacitor C1, wherein the DC bus voltage $V_{bus}$ is associated with the input AC voltage, AC INPUT. The line voltage UP of a three-phase winding may be the PWM chopper output voltage, UP=$V_{bus}$*w, where w is the duty ratio of the PWM signal that the microprocessor inputs to the inverter circuit. Note that changing the line voltage UP can change the DC bus current $I_{bus}$. An inverter circuit may consist of electronic switches Q1, Q2, Q3, Q4, Q5, and Q6, wherein the control ends of electronic switches Q1, Q2, Q3, Q4, Q5, and Q6 are controlled by 6-channel PWM signals P1, P2, P3, P4, P5, and P6 output by a microprocessor. The inverter circuit may also use resistor R1 to sense the DC bus current $I_{bus}$, wherein the DC bus current sensing circuit converts the sensed bus current $I_{bus}$ through resistor R1, and sends the result to the microprocessor. Motor input power may be controlled by the electronic switch Q7, wherein the microprocessor outputs a PWM signal to control switch Q7. That is, microprocessor output P0 may be used to control the electronic switch tube Q7, which in turn controls the motor input power.

Figure 8:
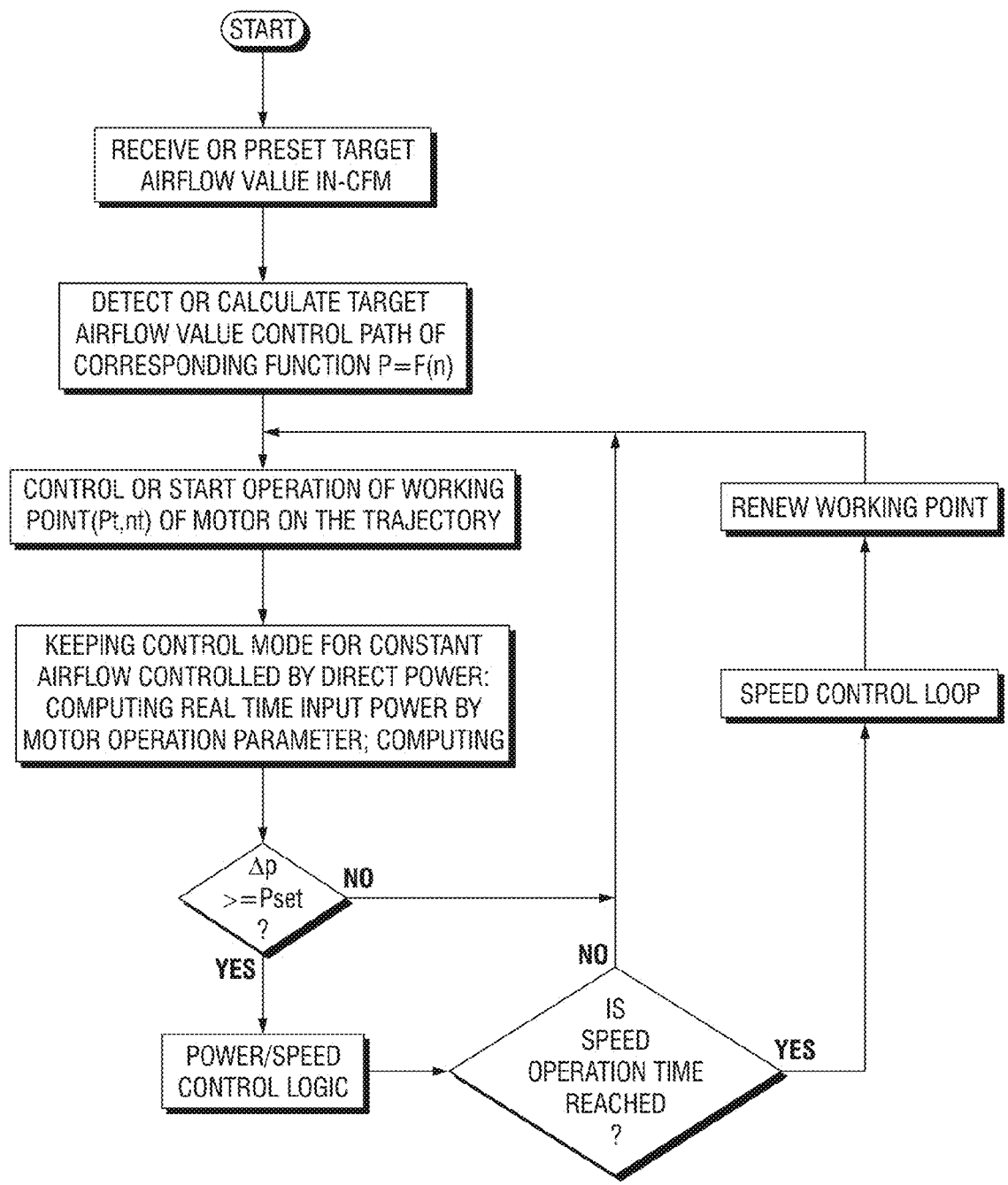
FIG. 8 is a flow chart diagram of a control method for constant airflow according to one embodiment of the disclosure.

In FIG. 8, a control method for providing constant airflow with a direct power-controlled PM motor of an HVAC system is provided. The PM motor may drive a fan wheel and may include stator components, PM rotor components, and a motor controller. The motor controller may include a micro processing unit, inverter circuit, rotor position sensing circuit, DC bus current sensing circuit, DC bus voltage sensing circuit, and motor input power control circuit (not shown). The rotor position sensing circuit may sense the rotor position signal and input the result to the microprocessor. The microprocessor may calculate the real-time speed n of a motor according to the rotor position signal. The DC bus current sensing circuit may input a DC bus current to the microprocessor, and the DC bus voltage sensing circuit may input a DC bus voltage to the microprocessor. The microprocessor may control the inverter circuit to control the power on/off signals for each coil winding of the stator component. The microprocessor may have circuitry to control motor input power. According to one embodiment, a control method for providing constant airflow with a direct power-controlled PM motor of an HVAC system includes the following steps:

Step A) starting a motor controller;

Step B) receiving or presetting a target airflow volume value IN-CFM;

Step C) obtaining a function P=$f(n)$ according to the target airflow value IN-CFM, where n is speed and P is the input power of the PM motor;

Step D) entering a direct power control mode for constant airflow control, wherein the motor is controlled so that the motor speed starts at zero and increases along the control path specified by the function P=$f(n)$ to reach a stable working point (pt, nt), wherein Pt, nt are located on the input power and speed pair trajectory specified by the constant airflow control function P=$f(n)$;

Step E) maintaining the direct power control mode for constant airflow control according to the motor operation parameters comprising $P_i$, wherein $P_i$ is the calculated real-time input power;

Step F) computing a power increment value $\Delta P$, wherein if the power increment value $\Delta P$ is less than a set value Pset, then the current working point is maintained;

Step G) if the power increment value $\Delta P$ is greater than or equal to the set value Pset, then power and speed control logic is executed to calculate a speed loop operating time to be reached, wherein if the operating time of the speed loop is not reached, then the current working point is maintained; and Step H) if the speed loop operating time is reached, then speed control circuitry is entered according to a regulated speed ni, which is the real-time speed of the motor, to realize a new working point on the input power and speed pair trajectory (Pi, ni), wherein Pt equals Pi, nt equals ni, and operation returns to step D).

According to an embodiment, the above-described function of P=$f(n)$ is obtained by collecting original data for a plurality of target air volumes by adjusting the static pressure from low static pressure to high static pressure. The range of static pressures may span the actual static pressure range experienced by the motor, and while the static pressure is adjusted the motor speed n and real-time input power Pi may be adjusted to keep airflow at a target air volume. The motor speed n and corresponding real-time input power Pi may be recorded for a plurality of target air volumes to produce a plurality of original data pairs of real-time input power Pi and speed n for the motor, wherein a function P=$f(n)$ is determined for a plurality of target airflow values by curve fitting the corresponding recorded original data pairs of real-time input power Pi and speed ni of the motor for the target airflow.

According to another embodiment, if the external input target airflow value IN-CFM is not approximately equal to one of the determined target airflow functions P=$f(n)$, then interpolation fitting may be used to calculate a new function P=$f(n)$ corresponding to the external input target airflow value IN-CFM, wherein the new function P=$f(n)$ may be used to perform the constant airflow control.

According to another embodiment, the above mentioned function relation formula P=$f(n)$ is a polynomial function: P=$C_m n^{m-1}+ \ldots +C_2 n+C_1$, where $C_1, C_2, \ldots,$ and $C_m$ are the coefficients and n is the motor speed value, and wherein each target airflow corresponding to a set of coefficients $C_1, C_2, \ldots,$ and $C_m$ is stored, and wherein the microprocessor obtains the corresponding set of $C_1, C_2, \ldots,$ and $C_m$ coefficients based on the input target airflow value IN-CFM and one of a look-up table that includes the determined target airflow functions P=$f(n)$ and the new function P=$f(n)$ calculated using the interpolation fitting.

According to another embodiment, the above-mentioned function relation formula P=$f(n)$ is a quadratic function: P=$C_3 n^2+C_2 n+C_1$.

Figure 9:
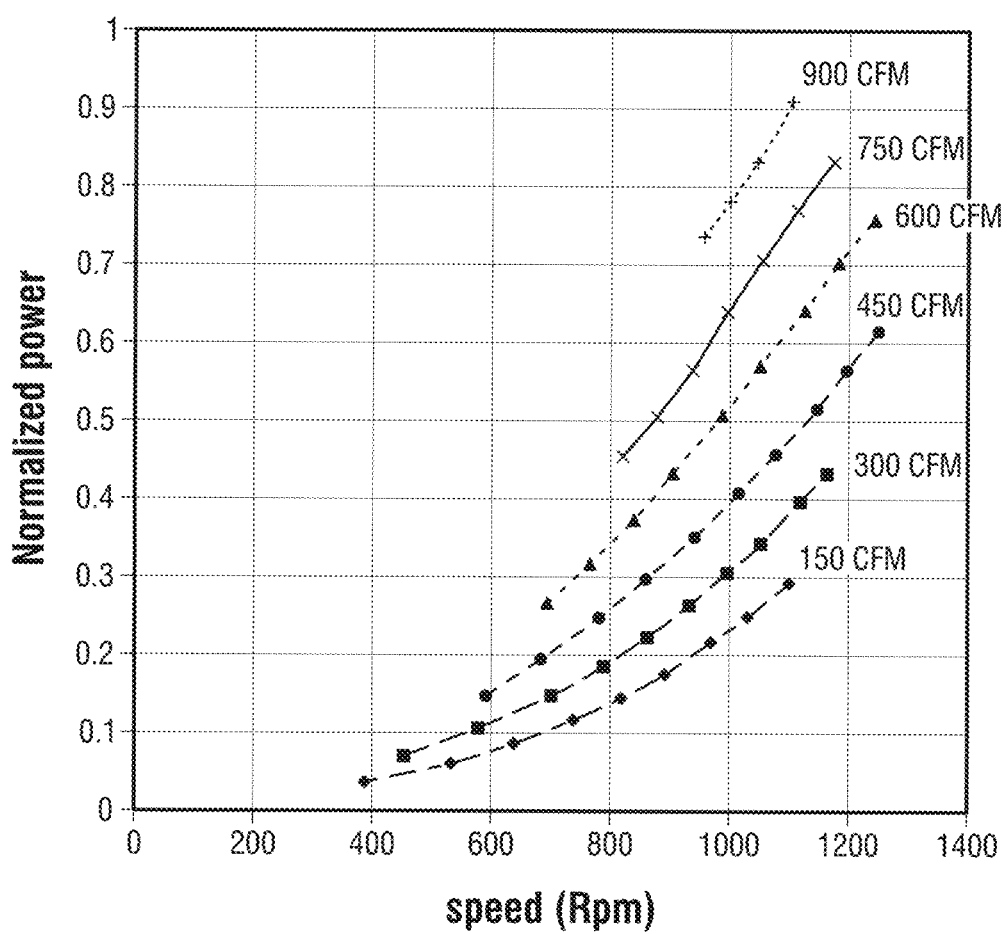
FIG. 9 is an illustration showing a set of fitted curves of constant airflow obtained by experimental measurement according to one embodiment of the disclosure.

The development of the control method of the present invention for constant airflow controlled by a direct-power controlled PM motor and the establishment of a mathematical model for the control method may be described as follows: generally, in a ventilation system, a fan driven by a PM motor produces airflow under a steady state. A constant airflow control may be realized through control of the speed and power of the motor at a static pressure, as shown in the following formula: CFM=F (P, speed, pressure), wherein CFM is airflow in Cubic Feet per Minute (CFM), P is the power, speed is rotation speed, pressure is static pressure. When the static pressure changes, the constant CFM is maintained, for example, within about plus or minus 5 percent, by the control of power and speed. When the static pressure is increased, the power and speed are varied. A cluster of constant airflow CFM curves can be tested, as shown in FIG. 9. A control model can be developed based on the CFM curves of constant airflow. When a system control determines a required airflow, a constant airflow CFM may be provided under specific static pressure through the control of power and speed.

In FIG. 9, characteristic curves represent physical properties of the power and speed to maintain constant air volume, for example, within about plus or minus 5 percent, within the entire power rating range of the motor and any type of airflow system designed by air-conditioning manufacturers. Based on the test results of the power and velocity curves, it can be concluded that a typical quadratic function, such as $P=C_3n^2+C_2n+C_1$, can be used to develop modeling curves through appropriate selection of three points ($C_1$, $C_2$, and $C_3$). In some embodiments, the coefficients $C_1$, $C_2$, and $C_3$ may be obtained using a least-squares method with given experimental data sets $\{(x_1, y_1), (x_n, y_n)\}$, where n=3. As an example, see the following formula:

$$F(A,B,C)=\Sigma_i^m(Y_i(C_3n_i^2+C_2n_i+C_1))^2,$$

where F(A, B, C) is minimized by solving the equations ∂F/∂A=0, ∂F/∂B=0, and ∂F/∂C=0.

The process of curve fitting includes the selection of curves of polynomials based on the least-squares method. In general, the function $P=C_mn^{m-1}+\ldots+C_3n^2+C_2n+C_1$ can be used to model the pairs of power and speed data as a curve. In one embodiment, the functional relationship between P and n may be a quadratic function: $P=C_3n^2+C_2n+C_1$, wherein $C_1$, $C_2$, and $C_3$ are the coefficients, n is the motor speed value, and any target airflow corresponds to a set of coefficients $C_1$, $C_2$, and $C_3$ stored among a plurality of target airflows. In some embodiments, the microprocessor may obtain a set of corresponding coefficients $C_1$, $C_2$, and $C_3$ based on the input target airflow value IN-CFM through the use of a look-up table method. Thus, the functional relationship formula P=f(n) may be obtained, wherein every target airflow corresponds to a set of coefficients $C_1$, $C_2$, and $C_3$ among any load, and they are shown in Table 1 below.

TABLE 1

| CFM | $C_1$ | $C_2$ | $C_3$ |
|---|---|---|---|
| 150 | 0.338 | −0.151 | 0.0458 |
| 300 | 0.4423 | −0.2113 | 0.0765 |
| 450 | ○ ○ ○ | ○ ○ ○ | ○ ○ ○ |
| 600 | ○ ○ ○ | ○ ○ ○ | ○ ○ ○ |
| 750 | ○ ○ ○ | ○ ○ ○ | ○ ○ ○ |
| 900 | ○ ○ ○ | ○ ○ ○ | ○ ○ ○ |

Figure 10:
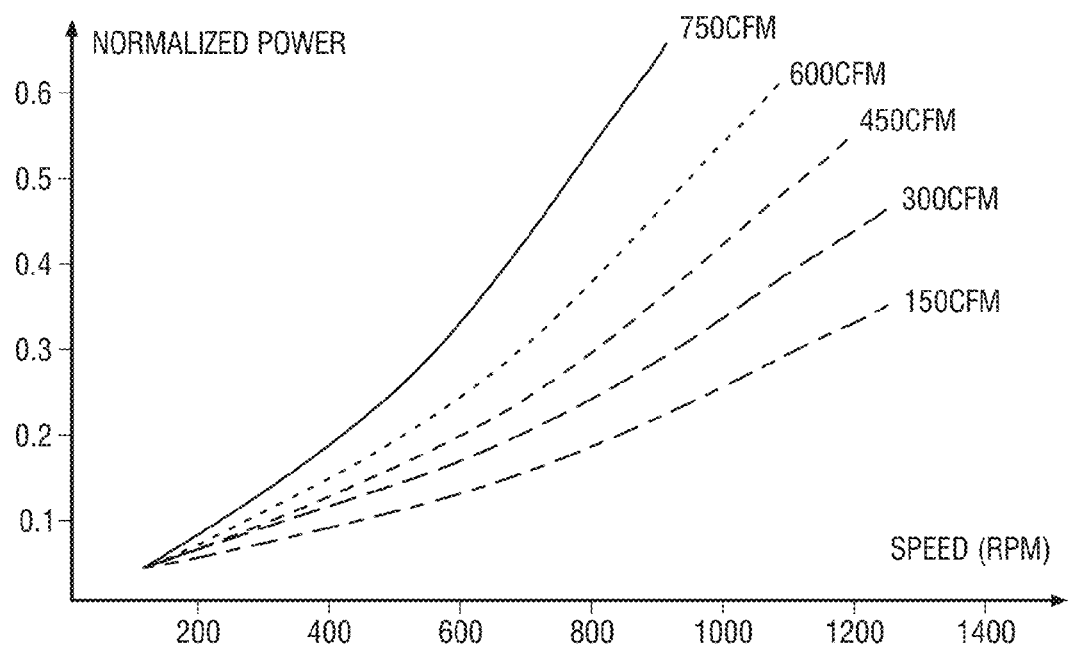
FIG. 10 is an illustration showing the fitting curves of experimental data of constant airflow that is controlled by a direct power-controlled ⅓ HP PM motor according to one embodiment of the disclosure.

FIG. 10 is an illustration showing the fitting curves of experimental data of constant airflow that is controlled by a direct power-controlled ⅓ HP PM motor in an HVAC system. For a given target airflow, a system may choose some typical airflow CFM volumes as test points to create a database in order to establish mathematical model. These typical points may include the minimum and maximum airflow CFM values, adding some intermediate points based on product specifications. In some embodiments, five typical airflow CFM test points include 150/300/450/600 and 750 CFM, respectively.

Table 2 shows an example of the test data results. The motor speed in table 2 ranges from 200 to 1400 RPM, and the static pressure of the system ranges from 0.1 to 1 in $HO_2$. Maintaining the preset constant airflow CFM output constant, for example, within about plus or minus 5 percent, a series of motor input power values are obtained, and a database is formed based on the obtained power values as shown in FIG. 10.

TABLE 2

| 150 CFM airflow | | 300 CFM airflow | | 450 CFM airflow | | 600 CFM airflow | | 750 CFM airflow | |
|---|---|---|---|---|---|---|---|---|---|
| Speed | Power | Speed | Power | Speed | Power | Speed | Power | Speed | Power |
| 385.3 | 3.6% | 452.2 | 6.9% | 590.1 | 14.8% | 693.6 | 26.6% | 822.9 | 45.6% |
| 385.9 | 3.6% | 577.7 | 10.6% | 680.6 | 19.6% | 763.9 | 31.6% | 878.1 | 50.4% |
| 531 | 6.0% | 700.3 | 14.6% | 778.5 | 24.7% | 839.3 | 37.2% | 936 | 56.4% |
| 637.3 | 8.6% | 787.5 | 18.4% | 858.4 | 29.8% | 905 | 43.2% | 997.9 | 63.9% |
| 737.4 | 11.6% | 861.2 | 22.2% | 940.5 | 35.2% | 987.8 | 50.6% | 1056 | 70.5% |
| 818.4 | 14.4% | 932.6 | 26.2% | 1015 | 41.0% | 1051 | 57.0% | 1115 | 77.1% |
| 891 | 17.4% | 997.9 | 30.5% | 1078 | 45.6% | 1127 | 64.1% | 1176 | 83.3% |
| 970.3 | 21.5% | 1053 | 34.2% | 1146 | 51.6% | 1184 | 70.2% | 1173 | 83.2% |
| 1029 | 24.8% | 1119 | 39.7% | 1197 | 56.6% | 1245 | 75.0% | | |
| 1100 | 28.3% | 1165 | 43.1% | 1252 | 61.6% | | | | |
| 1163 | 32.4% | | | | | | | | |

Each preset CFM airflow may correspond to a quadratic function of power and speed that is obtained using a standard calculation process that applies the least-squares method. Equations (3) through (7) define a pair of power and speed working points for any system working point at a specific static pressure.

$$\text{Power}(150) = 0.3388\left(\frac{\text{Speed}}{1000}\right)^2 - 0.1551\left(\frac{\text{Speed}}{1000}\right) + 0.0458 \quad (3)$$

$$\text{Power}(300) = 0.4423\left(\frac{\text{Speed}}{1000}\right)^2 - 0.2113\left(\frac{\text{Speed}}{1000}\right) + 0.0765 \quad (4)$$

$$\text{Power}(450) = 0.3987\left(\frac{\text{Speed}}{1000}\right)^2 - 0.0308\left(\frac{\text{Speed}}{1000}\right) + 0.0294 \quad (5)$$

$$\text{Power}(600) = 0.2580\left(\frac{\text{Speed}}{1000}\right)^2 + 0.3983\left(\frac{\text{Speed}}{1000}\right) - 0.1379 \quad (6)$$

$$\text{Power}(750) = 0.1385\left(\frac{\text{Speed}}{1000}\right)^2 + 0.8150\left(\frac{\text{Speed}}{1000}\right) - 0.3139 \quad (7)$$

According to an embodiment, when an airflow input IN-CFM is input, the motor system may use a corresponding power and speed pair quadratic function to define a working point trajectory to follow during motor operation to maintain constant the preset airflow CFM value. In general, equations (3) to (7) can be expressed as a standard equation $P(CFM)=C_3n^2+C_2n+C_1$ (Equation 8), where $C_1$, $C_2$, and $C_3$ are constants, n is speed, and P is power.

Figure 11:
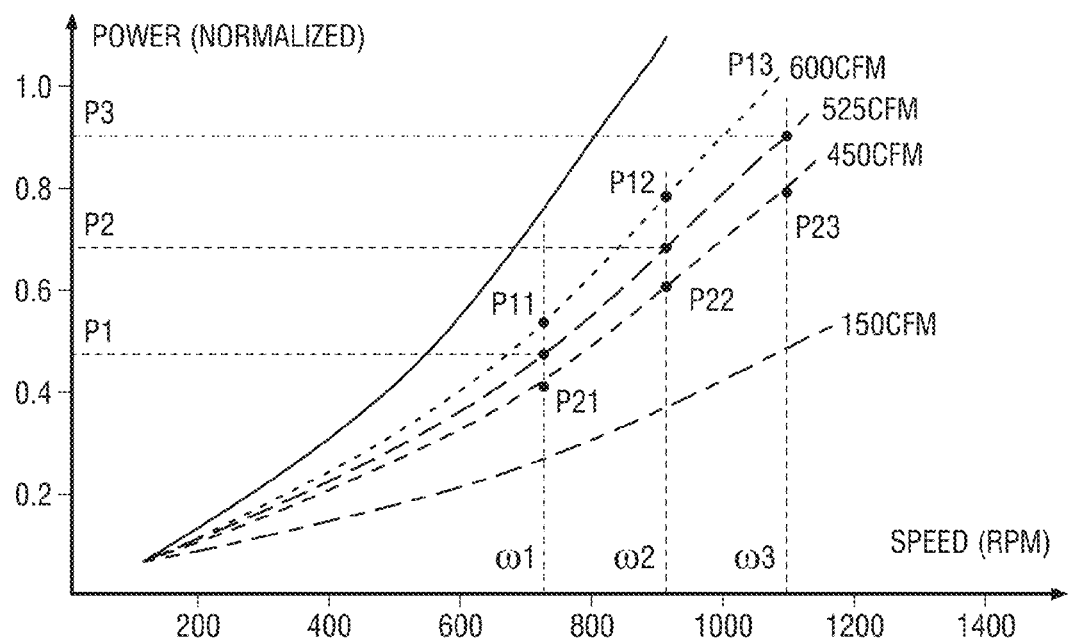
FIG. 11 is an illustration showing the fitting curves of experimental data when any input airflow is solved by the method of interpolation according to one embodiment of the disclosure.

Equations (3) to (7) define five modeling curves that provide working point trajectories for several constant airflow CFM options. As shown in FIG. 11, when a requested constant airflow CFM volume input is not on one of the determined modeling curves, an interpolation method may be used to obtain a new characteristic equation to fit to the requested constant airflow CFM volume input. For example, when a constant air volume input specifying that IN-CFM=525 CFM is received, the two adjacent curve models CFM1-600 CFM and CFM2-450 CFM may be identified. Then the two corresponding equations can be used to calculate the new equation for the 525 CFM curve. Based on the input-specified CFM rate, three selected speeds, $\omega_1$, $\omega_2$, and $\omega_3$ may be identified to calculate the power values at these speeds using the corresponding equations of the two adjacent modeling curves, as shown below.

$$\begin{bmatrix} W_i \\ P_1(600) \\ P_2(450) \end{bmatrix} = \begin{bmatrix} \omega_1 & \omega_2 & \omega_3 \\ p_{11} & p_{12} & p_{13} \\ p_{21} & p_{22} & p_{23} \end{bmatrix}$$

For the pair of power points $(p_{1i}, p_{2i})$ at a selected speed, a linear weighted interpolation can be used to calculate the $p_i$ value, as shown below.

$$p_i = p_{2i} + w \cdot (p_{1i} - p_{2i}) \quad (9)$$

In equation (9) above, i=1, 2, and 3, and w is the weighted coefficient that can be calculated as:

$$w = \frac{CFM - CFM2}{CFM1 - CFM2} \quad (10)$$

Noticing that CFM2≤CFM≤CFM1, and so 0≤w≤1, the following matrix equations can be calculated as, $$\begin{bmatrix} \omega_1^2 & \omega_1 & 1 \\ \omega_2^2 & \omega_2 & 1 \\ \omega_3^2 & \omega_3 & 1 \end{bmatrix} \begin{bmatrix} K_1 \\ K_2 \\ K_3 \end{bmatrix} = \begin{bmatrix} p_1 \\ p_2 \\ p_3 \end{bmatrix} \quad (11)$$

By solving the matrix equation, the coefficients of equation 8, $C_1$, $C_2$, and $C_3$ can be calculated such that the function $P=C_3 n^2 + C_2 n + C_1$ corresponding to the IN-CFM=P=525 CFM can be obtained. Therefore, the power equation of any requesting input airflow command IN-CFM can be obtained. Because the process may be completed in the MCU initialization, the MCU does not need to consume much CPU calculation power.

Motor real-time input power Pi may be filtered by a digital low-pass filter. Assume that samples of the input and output are taken at a sampling cycle, separated by $\Delta t$ time (PWM switching frequency). The power inputs may be represented by the sequence $(P_{in1}, \ldots, P_{inn})$ and the outputs may be represented by the sequence $(P_{out1}, \ldots, P_{outn})$, which correspond to the same points in time, then the low-pass filter can be given as $$P_{ini} = P_{outi} = T \frac{P_{outi} - P_{outi-1}}{\Delta t},$$

where T is the time constant. Rearranging the terms above gives the recurrence relation, and the discrete-time low-pass filter can be expressed as the exponentially-weighted moving average, given as $P_{outi} = \alpha \cdot P_{ini} (1-\alpha) \cdot P_{out}$ where $$\alpha = \frac{\Delta t}{T + \Delta t}.$$

By definition, the smoothing factor relationship is 0≤α≤1. If α=0.5, then the time constant $$T = \Delta t \left( \frac{1-\alpha}{\alpha} \right)$$

becomes equal to the sampling period. If α<<0.5, then time constant T is significantly larger than the sampling interval. For power filtering in direct power control, α≤0.01. So $\Delta t \approx \alpha \cdot T$.

The change from one filter output to the next is proportional to the difference between the previous output and the next input. This exponential smoothing property matches the exponential decay in the continuous-time system. As expected, as the time constant T increases, the discrete-time smoothing factor α decreases, and the output samples $(P_{out1}, \ldots, P_{outn})$, respond more slowly to a change in the input sample $(P_{in1}, \ldots, P_{inn})$, hence the system has more inertia.

This filter technique can also be applied to the DC bus voltage and DC bus current in scalar control, where the DC bus power is calculated by processing both signals on the DC bus.

It can be seen that Direct Power Control (DPC) may achieve power control by speed control. The function of the power/speed control logic may be to coordinate the power/speed loop time constant to ensure the stability of the system. Power calculations can also be calculated more precisely by motor control than by torque calculation. In addition, speed control to implement power control can be precisely controlled by motor controls using either scalar or vector control in comparison with the torque control.

Figure 13:
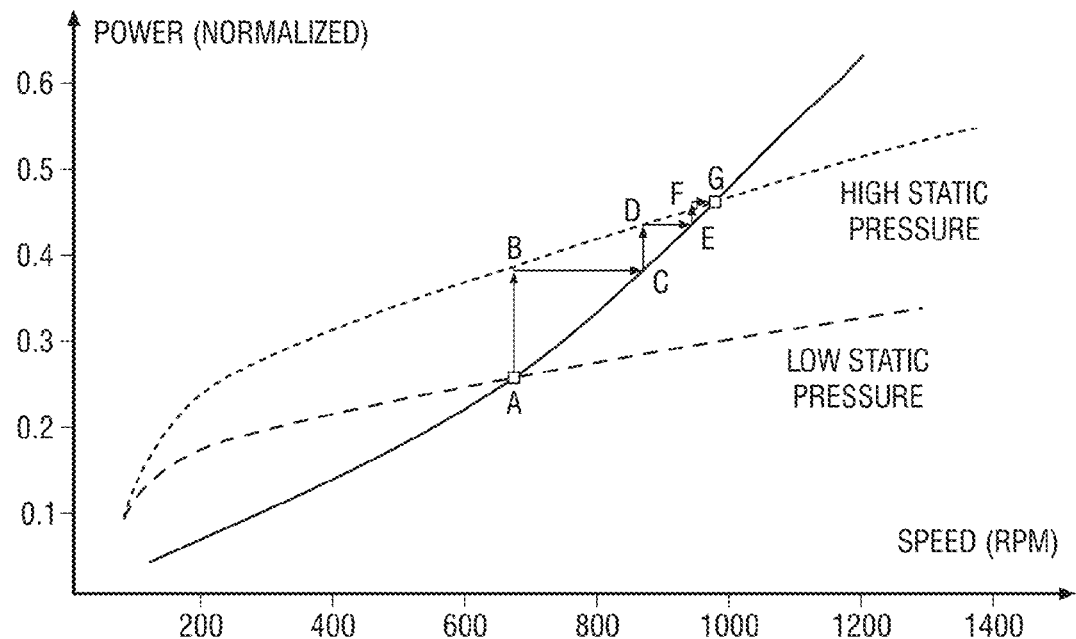
FIG. 13 is a schematic view of a control process of a constant airflow control method according to one embodiment of the disclosure.

The direct power control may be achieved by speed control because of the unique power and speed characteristic of blower load. As speed increases, the power increases simultaneously. Therefore, as the motor speed goes from zero speed to high speed, so does the power. The motor speed may rise until reaching a working point pair of power and speed that associates with the static pressure of the load condition, such as stable working point "A" in FIG. 13. When the static pressure suddenly increases while in the speed control mode, the motor must provide more power (or more torque) to maintain the speed because high static pressure has a larger power requirement to maintain the same speed. Therefore, the power suddenly rises to a higher work rate. When the motor system reaches a new working point "B" at the same speed, the algorithm will know that it is not a working point on the constant CFM trajectory curve, and will therefore determine a pair of speed/power on point "C." But point C is not a stable working point because higher power is demanded, so the motor operating point moves to point "D," and repeats the process until converging to a new stable working point "G."

Figure 14:
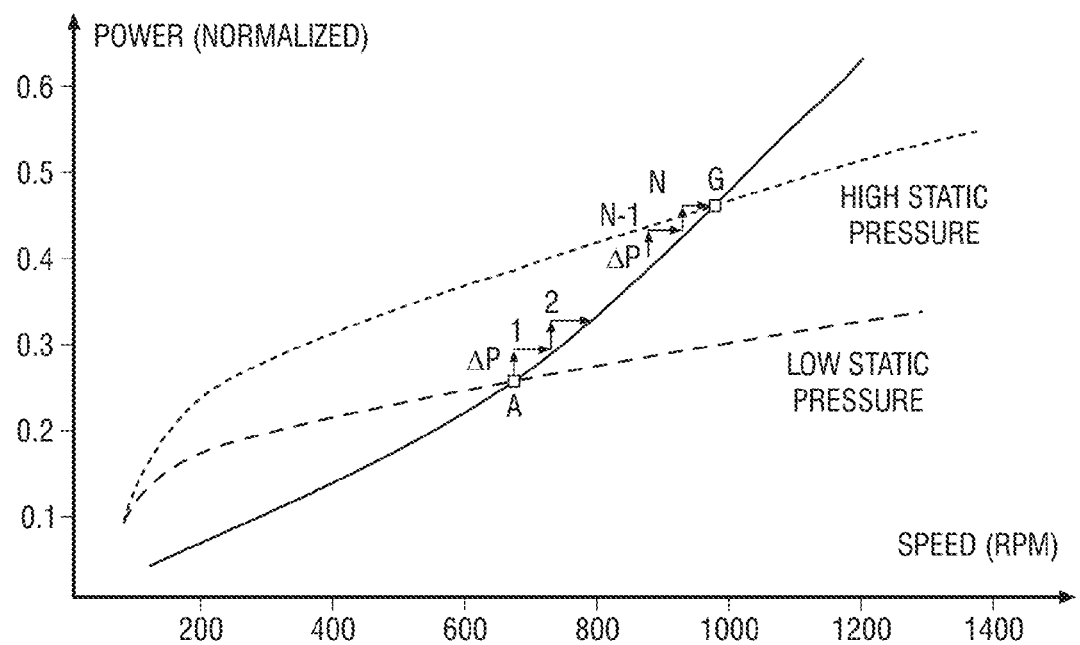
FIG. 14 is another schematic view of a control process of a constant airflow control method according to one embodiment of the disclosure.

In implementation, the power fluctuation that results from the sudden changes in pressure can be reduced by using a restricted power increment control. As shown in FIG. 14, the incremental power can be specified as $\Delta P$. As soon as the power change is beyond the power increment $\Delta P$, speed control may be engaged to control the speed. In this way, all the motor working points may be within a plus/minus bandwidth on the corresponding constant airflow CFM trajectory curve. As a result, the airflow control system may be controlled in a more stable operation during any transition when pressure changes.

Figure 15:
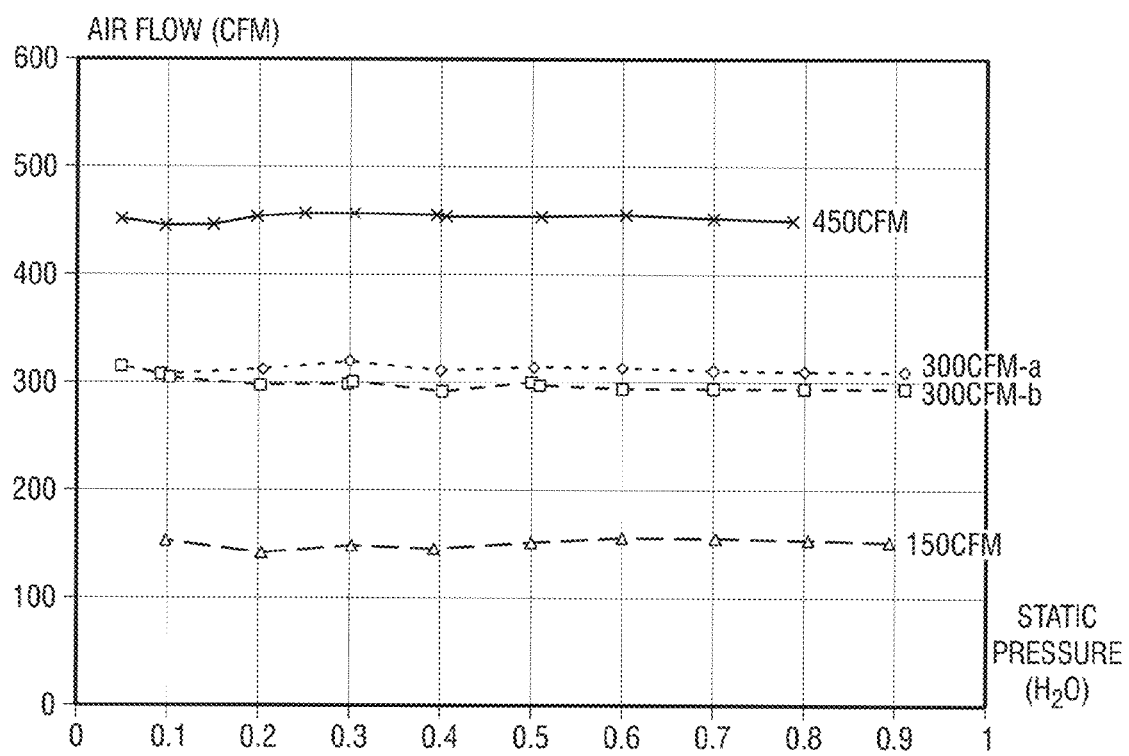
FIG. 15 is an illustration showing test results of a constant airflow control method through experimental verification according to one embodiment of the disclosure.

FIG. 15 is an illustration showing test results of a constant airflow control method obtained through experimental verification. The test results show that the entire system performance meets the requirements of the system, as shown in FIG. 15.

Figure 12:
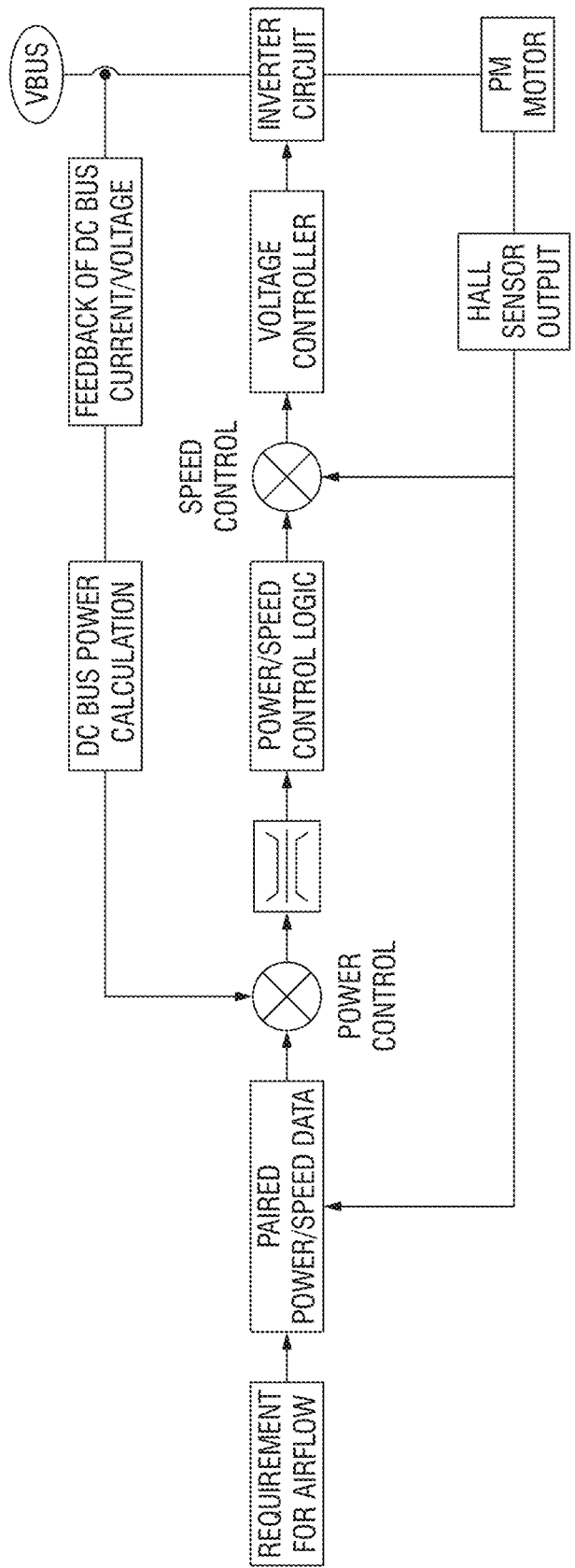
FIG. 12 is a schematic block diagram illustrating the control logic of a constant airflow control method according to one embodiment of the disclosure.

FIG. 12 is a logic block diagram of the algorithm for a constant airflow control method in a PM motor scalar control application, wherein the input power is computed based on the DC bus voltage and DC bus current. In some embodiments, power and speed of the motor may be limited to a maximum power $P_{max}$ and a maximum speed $n_{max}$.

The motor real-time input power value $P_i$ may be computed based on the DC bus voltage/current fed back to the MCU. Then, based on the air volume specified via the external input IN-CFM and the corresponding power/speed data, the target motor input power Pt may be calculated. A comparison of the calculated target motor input power value Pt and the motor real-time power $P_i$ may be performed to obtain the power difference $\Delta P$. The power of the motor may be adjusted until $P_i$ approximately equals Pt, for example, within about plus or minus 5 percent. While the power is adjusted, the power differential $\Delta P$ may be limited to a maximum to avoid power differentials $\Delta P$ that are too large. Power difference $\Delta P$ may be output using the power/speed control logic, speed loop control, and PWM inverter speed control, as shown in FIG. 12.

EXAMPLE 2

The greatest difference between this example and example 1 is that in example 1 the motor real-time input power value $P_i$ is calculated based on the real-time bus current and the real-time bus voltage based on scalar control. In contrast, in example 2, the PM motor employs sensorless vector control, wherein the calculation of the motor real-time input power $P_i$ is more complicated.

Figure 16:
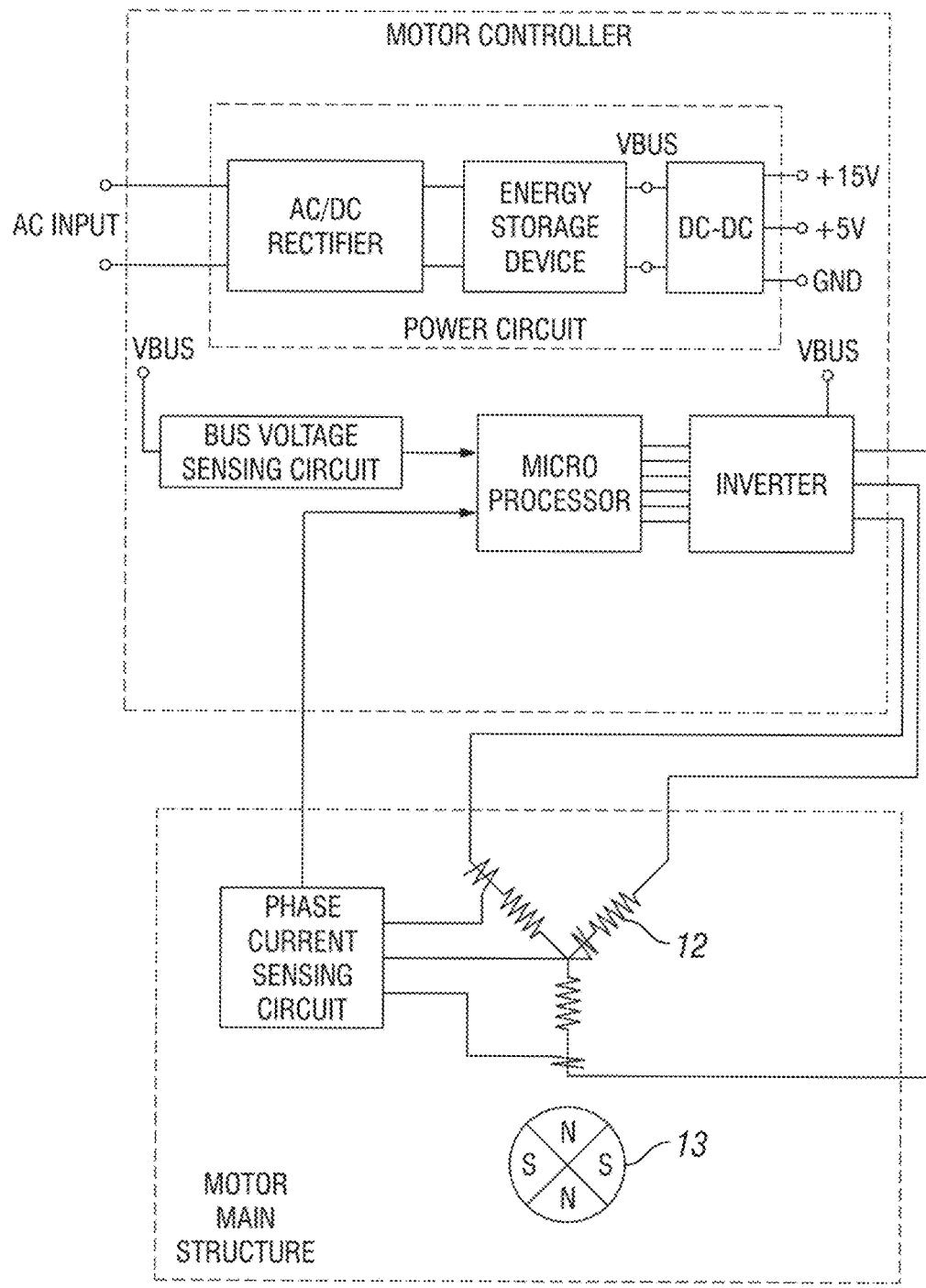
FIG. 16 is a circuit block diagram illustrating a motor controller of a PM motor according to one embodiment of the disclosure.
Figure 17:
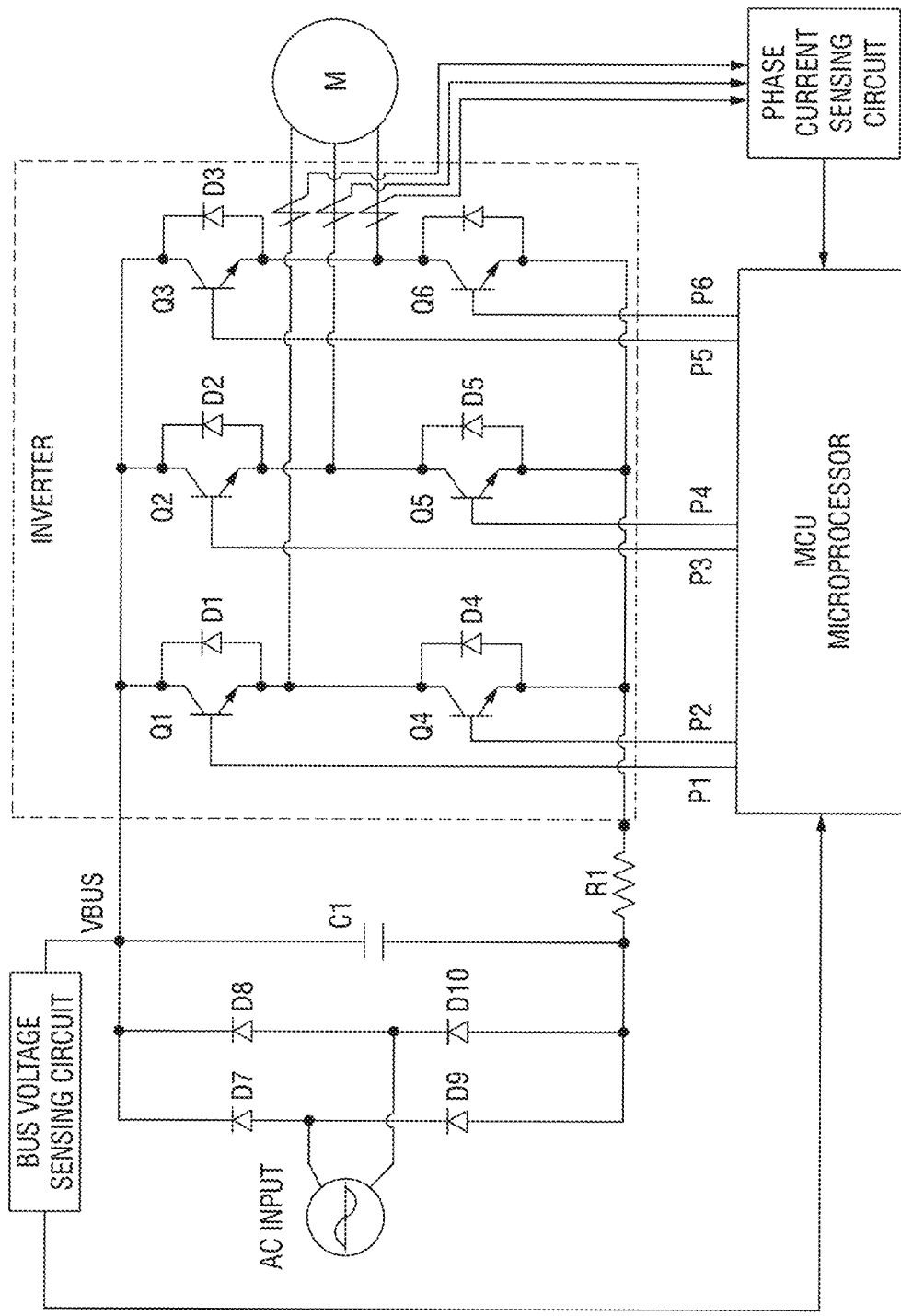
FIG. 17 is a circuit block diagram corresponding to FIG. 12.
Figure 18:
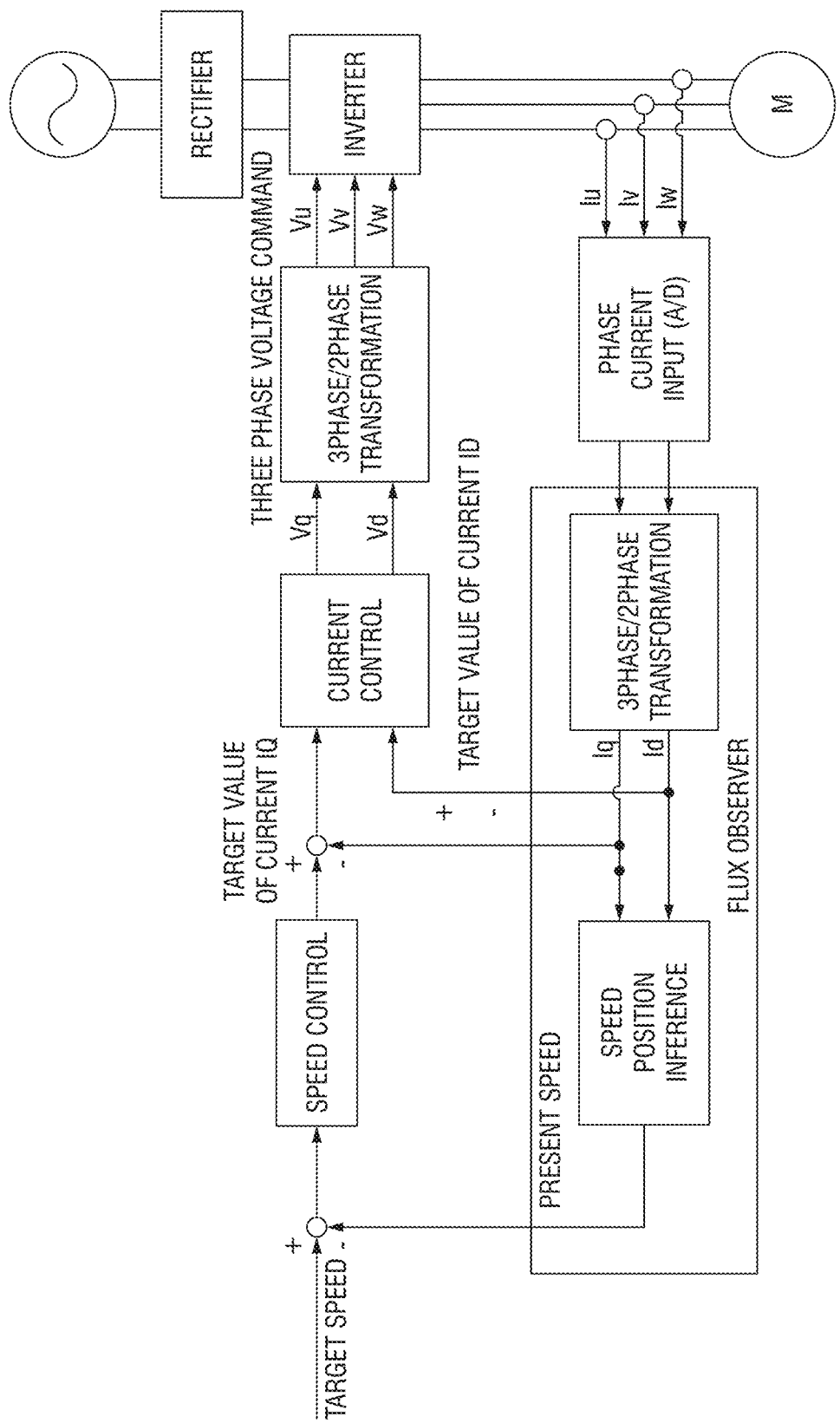
FIG. 18 is a schematic block diagram of a traditional and typical PM motor vector control scheme.

As shown in FIG. 16 and FIG. 17, assuming that the PM motor is a three phase brushless DC permanent magnet synchronous motor and that sensorless vector control is used to determine the rotor position, a phase current sensing circuit may be used to sense the phase current of the stator windings. The phase current may be input to the microprocessor, and a flux observer within the microprocessor may calculate the rotor rotational speed n and rotor position based on the phase current and DC bus voltage. AC input may pass through the full-wave rectifier circuit that includes diodes D7, D8, D9, and D10. A DC bus voltage $V_{bus}$ may be output on one end of the capacitor C1, wherein DC bus voltage $V_{bus}$, is associated with the AC input voltage. FIG. 18 is a block diagram of a motor control system using vector control.

Figure 19:
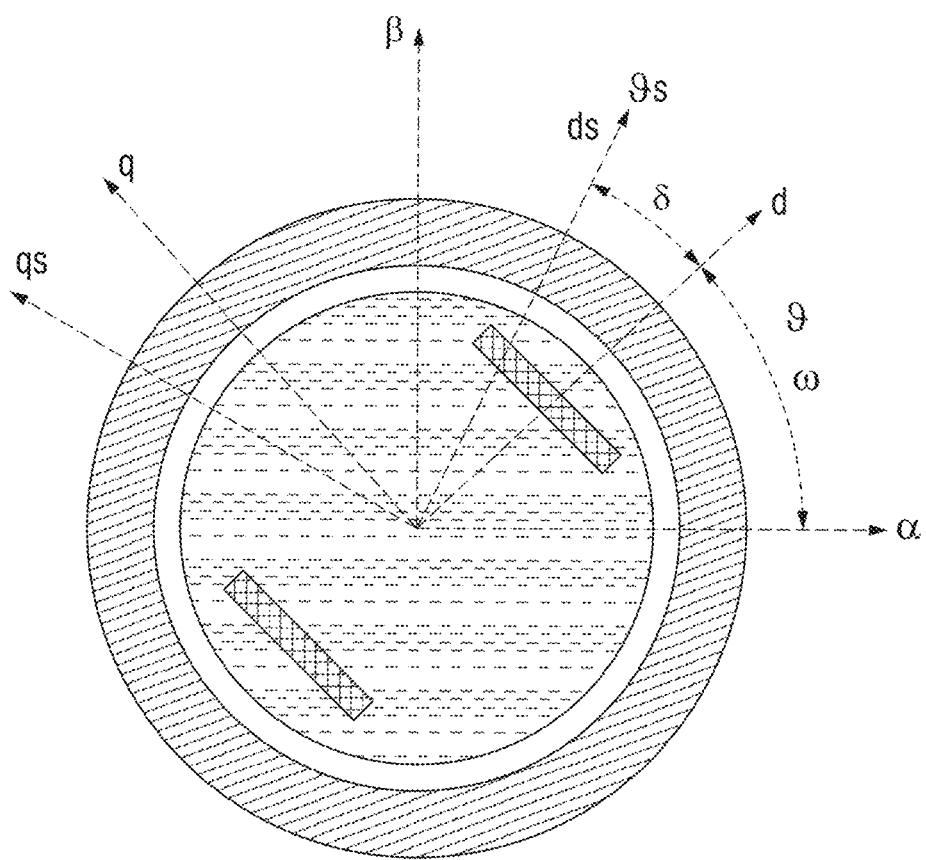
FIG. 19 is a relation diagram of each coordinate system of a traditional and typical PM motor vector control scheme.

FIG. 19 illustrates the coordinate systems that may be used for vector control. Vector control theory is sufficiently described in textbooks and patent literature, so there is no need for a description here. If the target speed being controlled were known, closed loop control can be realized through vector control. There are three coordinate systems illustrated in FIG. 19: a fixed Cartesian coordinate system ($\alpha$-$\beta$ coordinates), a rotor rotating coordinate system (d-q axis coordinate system), and a stator flux rotating coordinate system (ds-qs axis coordinate system). In FIG. 19, $\omega$ represents the rotor speed, theta represents the rotation intersection angle for the d-q axis coordinate system and the $\alpha$-$\beta$ coordinates, and $\delta$ represents the rotation loading angle for the d-q axis coordinate system and the ds-qs axis coordinate system. According to an embodiment, the vector current and vector voltage for the d-q axis coordinate system can be converted to the current and voltage for the $\alpha$-$\beta$ coordinate system.

In vector control, such as in the vector control systems shown in FIGS. 16 and 17, a motor operation parameter sensing circuit may include a phase current sensing circuit and a bus voltage sensing circuit to sense the phase current and bus voltage, respectively. The sensed data may be input to a microprocessor for further processing. The real-time phase currents may be converted to current L and current $I_\beta$ on $\alpha$-$\beta$ beta coordinates, and the real-time bus voltages may be converted to voltage $V_\alpha$ and voltage $V_\beta$ on $\alpha$-$\beta$ coordinates. The motor real-time input power may be calculated as $P_i = 3/2 \ (V_\alpha \cdot I_\alpha + V_\beta \cdot I_\beta)$.

Figure 20:
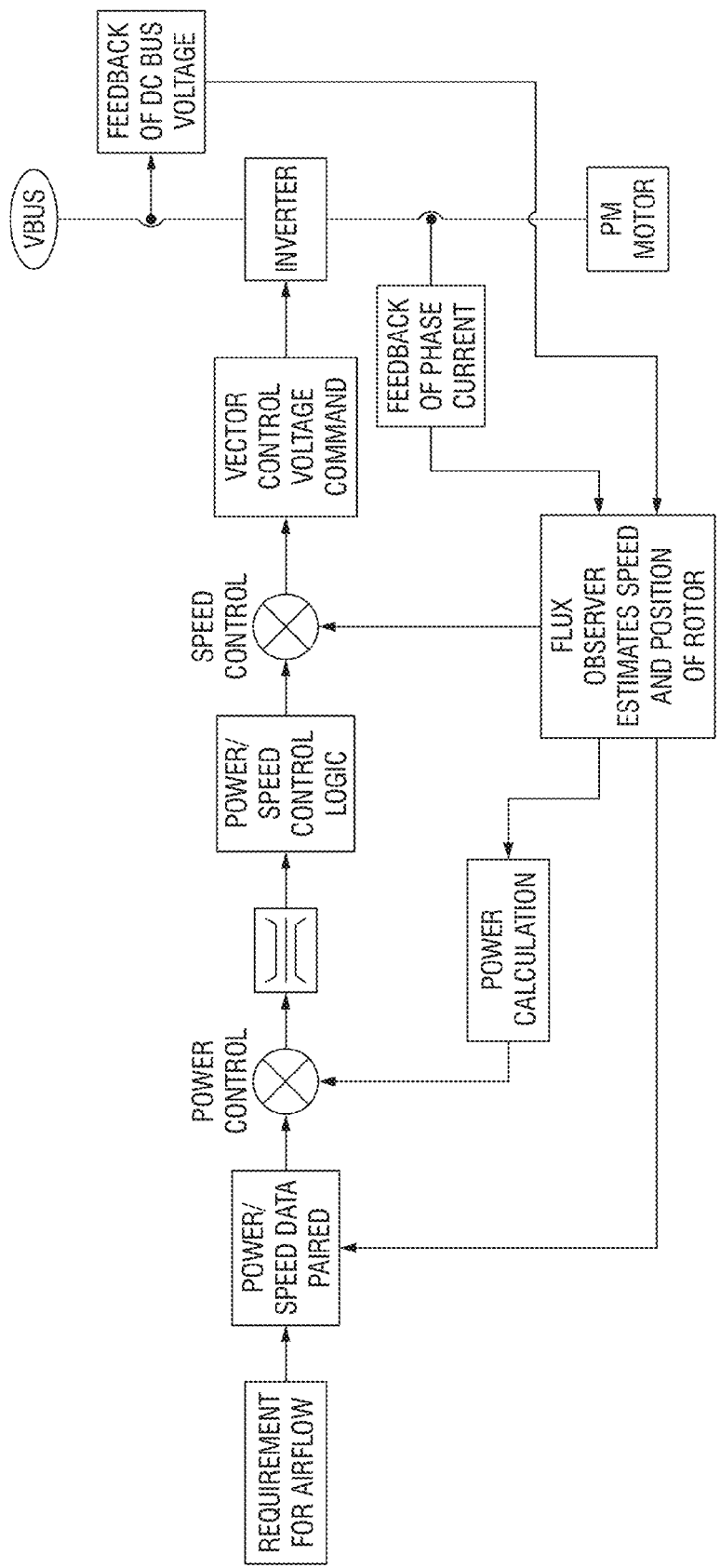
FIG. 20 is a schematic block diagram illustrating the control logic for a constant airflow control method according to one embodiment of the disclosure.

FIG. 20 is a schematic block diagram illustrating the control logic for a constant airflow control method using sensorless vector control for direct-power controlling a PM motor system. The input power may be calculated using vector control. The power may be used as the power control after being filtered. A flux observer may be used to estimate the rotor speed and position. Based on the matching of the external input airflow command IN-CFM and power/speed data, the corresponding target motor input power value Pt may be determined by a function $P=f(n)$. The target motor input power value Pt and the motor real-time output power Pi may be compared, and the power difference $\Delta P$ may be obtained. The power of the motor may be adjusted until $P_i$ approximately equals Pt, for example, within about plus or minus 5 percent, and while the power is adjusted, the power differential $\Delta P$ may be limited to a maximum to avoid power differentials $\Delta P$ that are too large. Power difference $\Delta P$ may be output using the power/speed control logic and the speed loop control, wherein speed loop control may be realized through vector control.

In some embodiments, motor operating parameters may experience significant variation, which may reduce the precision with which the motor can be controlled. As a result, the motor may operate with a level of uncertainty. Also causing reduction in the precision with which the motor can be controlled may be the complexity associated with an HVAC system that may be a result of the numerous complex components that make up an HVAC system. According to one embodiment, advanced motor system modeling may be employed to mathematically model operating parameters of the motor system. As a result, a target power determined for the motor to produce constant airflow in the HVAC system may account for the variability, and hence be more precise.

Figure 21:
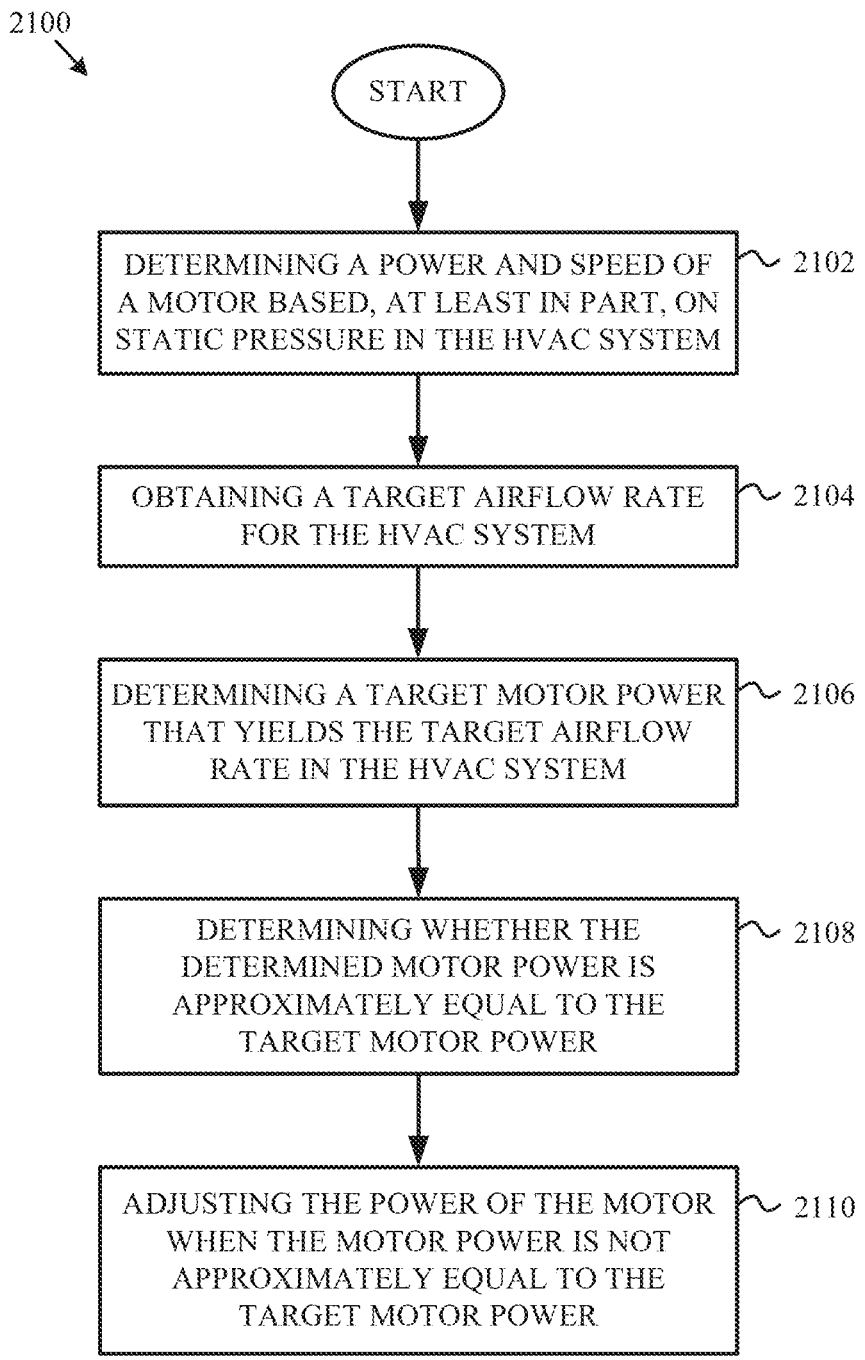
FIG. 21 is a flow chart diagram illustrating a motor control method for constant airflow that utilizes advanced mathematical modeling of a motor system according to one embodiment of the disclosure.

FIG. 21 illustrates a motor control method 2100 for constant airflow that utilizes advanced mathematical modeling of the motor system according to one embodiment of the disclosure. It is noted that embodiments of method 2100 may be implemented with the systems described above with respect to FIGS. 1-7, 12, 16-18, and 20. Specifically, method 2100 includes, at block 2102, determining a power and speed of a motor based, at least in part, on static pressure in the HVAC system. In some embodiments, when static pressure in an HVAC system changes, the power and speed necessary to maintain a constant airflow rate in the HVAC system may also change. Accordingly, determining the power and speed of the motor based on static pressure in the HVAC system may ensure that parameters, such as power and speed, that are representative of the motor's operation in the HVAC system track the variation of the static pressure in the HVAC system. According to one embodiment, the power and/or speed of the motor may be determined as a function of the static pressure in the HVAC system by determining the power and/or speed of the motor in real-time while the HVAC system is in operation because fluctuations in static pressure may occur naturally while the HVAC system is operating, for example, as the number of inlets and/or outlets opened or closed changes or as air filters clog. Although thus far the determination of both the power and speed of the motor based on the static pressure in the HVAC system has been described, it should be appreciated that in some embodiments, only the speed of the motor may be determined based on the static pressure in the HVAC system, while in other embodiments only the power of the motor may be determined based on the static pressure in the HVAC system.

In some embodiments, the motor power may be determined based, at least in part, on instantaneous values of a DC bus voltage and a DC bus current on an inverter coupled to the motor. For example, in one embodiment, when scalar control is utilized for the motor control system, such as is illustrated in FIG. 12, the motor power, i.e., the DC bus power, can be calculated by processing both signals on the DC bus coupled to the inverter that is coupled to the motor.

In another embodiment, the motor power may be determined based, at least in part, on DC bus voltage on an inverter coupled to the motor and phase currents of the motor, wherein the phase currents may correspond to the currents on a plurality of phase windings of a stator of the motor. For example, in one embodiment, when vector control is utilized for the motor control system, such as is illustrated in FIGS. 16-18 and 20, the motor power, i.e., the electromagnetic power, can be calculated by processing the DC bus voltage on the inverter coupled to the motor to determine the voltage, and by using a phase current sensing circuit to sense the phase currents of the stator windings to determine the phase current.

Returning to FIG. 21, at block 2104, method 2100 may include obtaining a target airflow rate for the HVAC system. In some embodiments, the obtained target airflow rate for the HVAC system may be received as an input from a user. For example, as illustrated in at least FIGS. 12, 18, and 20, a requirement for airflow, e.g., a target airflow rate, may be received as an input from a system controller or other component that is configured to receive inputs and to interface with the motor controller, e.g., the motor control system. In other embodiments, the motor control system may preset a target airflow rate for the HVAC system.

Method 2100 may include, at block 2106, determining a target motor power that yields the target airflow rate in the HVAC system, wherein the target motor power may be determined based, at least in part, on the determined speed of the motor and the obtained target airflow rate for the HVAC system. In some embodiments, determining the target motor power that yields the target airflow rate in the HVAC system may include calculating the target motor power based, at least in part, on an exponential non-linear higher-order function of at least the determined speed, the obtained target airflow rate for the HVAC system, and motor operation parameters.

For example, as noted previously, the airflow rate can be modeled as a function of the power and speed of the motor and the static pressure in the HVAC system. Similarly the power may be modeled as a function of the airflow rate, motor speed, and the static pressure in the HVAC system. As an example, for any airflow rate, as the static pressure in the system changes, a pair of motor power and motor speed can be determined to compensate for the static pressure change and control the motor to maintain the airflow rate constant.

Figure 22:
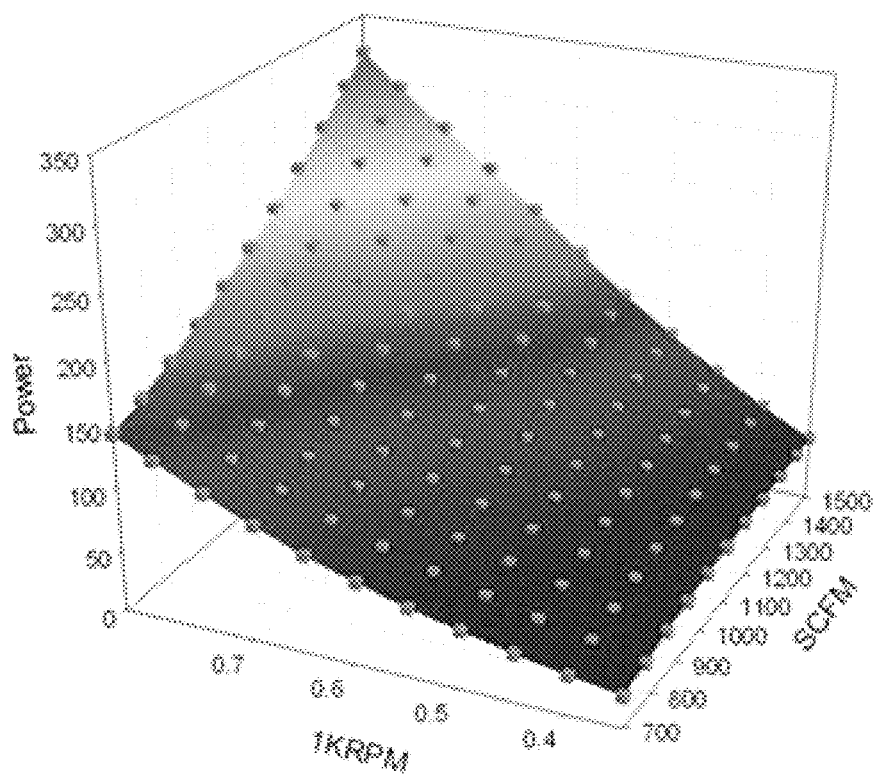
FIG. 22 is a three-dimensional (3-D) plot illustrating the relationship between motor power, motor speed, and the airflow rate according to one embodiment of the disclosure.

In some embodiments, the changes in the system's static pressure can be represented by a change in the motor's speed. Therefore, the motor power may be modeled as a function of the airflow rate and the motor speed such that Power=ƒ(CFM, Speed), where CFM is the target airflow rate and the motor speed, Speed, is a function of the static pressure in the system. FIG. 22 illustrates the three-dimensional (3-D) relationship between motor power, motor speed, and the airflow rate according to one embodiment of the disclosure. In some embodiments, the modeling of power as a function of the airflow rate and the motor speed, for example, as shown in FIG. 22, may universally represent the entire motor power range in an HVAC system. Therefore, in some embodiments, a two-variable function, such as Power=ƒ(CFM, Speed), may satisfactorily mathematically model an HVAC system.

In some embodiments, to develop the functional relationship illustrated in FIG. 22 for a motor in an HVAC system, the minimum and maximum airflow rates may be selected to meet system design and product specifications. As an example, and not limitation, for a general ½ horsepower motor in an HVAC system with an average duct network, typical airflow rates may range from 700 CFM to 1500 CFM. Similarly, the minimum and maximum motor speeds may be defined based on the range of static pressure that may be experienced in the HVAC system. In addition, the motor speed range may also depend on the motor's specifications.

According to the embodiment of FIG. 22, motor power may be defined as a non-linear higher-order function of the two independent variables, motor speed and airflow rate. As an example, and not limitation, in some embodiments, the relationship may be mathematically modeled as:

$$f(x,y,k)=k_0+k_1 \cdot x+k_2 \cdot y+k_3 \cdot x \cdot y+k_4 \cdot y^2 \tag{12}$$

$$z_i=f(x_i,y_i,k), i=1, 2, \ldots m, \tag{13}$$

where z=motor power, x=airflow rate, y=fan speed, which may be equivalent to the rotational speed of the motor's rotor, and $k_j$=a vector k of parameters j=0, 1, ..., n, where n=4 in equation (12). According to an embodiment, the two non-linear terms x·y=airflow rate·speed and $y^2$=speed$^2$ may improve the regression precision.

Equations (12) and (13) show that determining the target motor power that yields the target airflow rate in the HVAC system, such as at block 2106, may include calculating the target motor power based, at least in part, on a non-linear higher-order polynomial function of at least the determined speed, the obtained target airflow rate for the HVAC system, and motor operation parameters. In addition, equations (12) and (13) show that the non-linear higher-order polynomial function of at least the determined speed, the obtained target airflow rate for the HVAC system, and motor operation parameters includes a product of at least one of: the obtained target airflow rate and the determined speed; and the determined speed and the determined speed.

Because in equation (12) the airflow rate and the speed are known variables, only the vector k of parameters may need to be determined to calculate the target motor power z. According to an embodiment, the vector k of parameters may be determined by minimization of an error function for the power function described in equation (12).

In many industrial applications, specifications may define precision as the percentage error, as opposed to a specific error value, of a parameter that must be met across the entire operating range for the system. For example, if airflow rate is the system parameter for which error is to be minimized and the HVAC system has a typical airflow rate that ranges from 700 CFM to 1,500 CFM, then error may be specified as 5% across the entire range from 700 CFM to 1,500 CFM, rather than 50 CFM. Otherwise, a discrepancy of 50 CFM may yield an error of 7.1% when the system is desired to be operating with an airflow rate of 700 CFM and may yield an error of 3.3% when the system is desired to be operating with an airflow rate of 1500 CFM. Therefore, precision with which the system operates may be reduced when an error value is monitored instead of the percentage error because the percentage error may vary depending on the target airflow rate for the system. Accordingly, in some embodiments, in order to operate the system with a high level of precision, the error function for the power function described in equation (12) may be a percentage error function.

In some embodiments, the power model function defined in equations (12) and (13) may be defined as an exponential power function to make use of popular exponential function characteristics. As example, and not limitation, in one embodiment, the power model function defined in equation (13) may be redefined as:

$$z_i = e^{f(x_i, y_i, k)}, \ i=1, 2, \ldots, m. \tag{14}$$

The popular exponential function characteristics may be summarized as:

$$\ln(\hat{Z}) - \ln(Z) = \ln\left(\frac{\hat{z}}{z}\right) \approx 1 - \frac{\hat{z}}{z} = \frac{z - \hat{z}}{z}, \ Z, \hat{Z} \neq 0, \tag{15}$$

where $Z$ is the measured value and $\hat{Z}$ is the predicted value. Equation (15) shows that the difference between the natural log of the predicted value and the natural log of the measured value yields the percentage error between the predicted value and the measured value. According to one embodiment, the exponential characteristics shown in equation (15) may be utilized to minimize the percentage error for the calculated target power, which may improve the modeling precision.

The power defined as a non-linear exponential function as shown in equation (14) may be transformed into a linear model by taking the natural log of both sides of equation (14) so that the functional relationship may be defined as below:

$$\ln(z_i) = f(x_i, y_i, k) \tag{16}$$

The sum of the squares may subsequently be defined as:

$$E = \Sigma_{i=1}^{n} [f(x_i, y_i, k) - \ln(z_i)]^2. \tag{17}$$

As shown in equation (17), the errors may be multiplicative and log-normally distributed. In addition, errors on $\ln(z)$ may be different regardless of the experimental errors on z. Moreover, with multiplicative errors that are log-normally distributed, using exponential model functions may yield unbiased and consistent parameter estimates with minimal to no outliers. According to an embodiment, the minimum value of E defined in equation (17) may occur when the gradient is zero. Because the model contains n parameters, n gradient equations may exist and can be defined as:

$$\frac{\partial E}{\partial k_j} = 0 (j = 0, \ldots, n). \tag{18}$$

According to one embodiment, the parameters of the vector k can be found by solving the standard matrix equation in equation (18). Upon determining the parameters of the vector k, the power, as defined in equations (14) and (16), may be completely defined. As shown in equations (14) through (18), in some embodiments, the motor operation parameters, e.g., the vector k of parameters, may be determined based, at least in part, on minimization of percent error of the exponential non-linear higher-order polynomial function of at least the determined speed, the obtained target airflow rate for the HVAC system, and motor operation parameters.

To summarize the model development described with equations (12)-(18), in some embodiments, the motor power may be expressed as:

$$\text{Power} = e^{f(x, y, k)} \tag{19}$$

where $f(x, y, k)$ can, in some embodiments, be defined as:

$$f(x, y, k) = k_0 + k_1 \cdot CFM + k_2 \cdot speed + k_3 \cdot speed + k_4 \cdot speed^2 \tag{20}$$

According to one embodiment, parameters of the vector k in equation (20) can be pre-calculated from experimental tests. In general, more data points obtained from the experimental tests to determine the parameters of the vector k may yield more accurate airflow rate control. In some embodiments, equally-spaced data points may not be necessary, although it may be preferred in some embodiments.

As shown in the embodiment illustrated in FIG. 22 and equations (12)-(14), (19) and (20), in some embodiments, a function with only five parameters may completely model the power of any motor over the entire range of speed and the over the entire range of airflow rates. The ability to universally model power for any motor to provide constant airflow based on five or fewer parameters provides significant advantages over conventional systems in industry. For example, in some embodiments, there may be a limited number of parameters that may be transferred to a motor controller from a main control system due to hardware constraints. Because the control methods disclosed herein use minimal parameters to control a motor, most motors may utilize the motor control methods disclosed herein without modifications being made to hardware. In other embodiments, fewer or more than five parameters may also be used to model the power as a non-linear exponential function of motor speed and system airflow rate.

In some embodiments, the power functions disclosed herein as mathematical models may provide universal and high precision control of motor power to deliver constant airflow in HVAC systems. In addition, the universal and high precision control schemes disclosed herein may standardize motor control modeling and simplify the implementation to meet industrial requirements.

In some embodiments in which the power is defined as in equation (13), the error function to be minimized may be the sum of residual error squares. For example, consider a set of m data points, $(x_1, y_1, k_1), (x_2, y_2, k_2), \ldots, (x_m, y_m, k_m)$, and a modeling function $z = f(x, y, k)$ that in addition to the variables, x and y, also depends on the n parameters, $k = (k_1, k_2, \ldots, k_n)$, where m>n. The vector k of parameters may be calculated so that the model best fits to the given data in the least squares sense. For example, the error function to be minimized may be the sum of residual error squares defined as:

$$E = \sum_{i=1}^{m} [z_i - f(x_i, y_i, k)]^2. \tag{21}$$

The parameters of the vector k can be found by solving the standard matrix equation in equation (18), and upon determining the parameters of the vector k, the power, as defined in equation (13), may be completely defined. As shown in equations (12), (13), and (21), in some embodiments, the motor operation parameters, e.g., the vector k of parameters, may be determined based, at least in part, on minimization of absolute error of the non-linear higher-order polynomial function of at least the determined speed, the obtained target airflow rate for the HVAC system, and motor operation parameters.

Returning to FIG. 21, at block 2108, method 2100 may also include determining whether the determined motor power is approximately equal to the target motor power. For example, as discussed with reference to the embodiments illustrated in FIGS. 12 and 20, a comparison of the calculated target motor input power value Pt and the motor real-time power Pi may be performed to obtain the power difference ΔP.

At block 2110, method 2100 may include adjusting the power of the motor when the motor power is not approximately equal to the target motor power, wherein the motor power is adjusted until the motor power is approximately equal to the target motor power. For example, as discussed with reference to the embodiments illustrated in FIGS. 12 and 20, the power of the motor may be adjusted until Pi equals Pt. In some embodiments, adjusting the power may include adjusting the speed of the motor when the motor power is not approximately equal to the calculated target motor power until the motor power is approximately equal to the calculated target motor power.

According to some embodiments, the motor power may be maintained constant when the motor power is approximately equal to the target motor power. For example, as discussed previously, in some motor control systems, such as those disclosed in FIGS. 1-7, 12, 16-18, and 20, the direct power control mode may be maintained for constant airflow control according to the motor operation parameters comprising Pi when Pi is approximately equal to Pt, wherein Pi is the calculated real-time input power and Pt is the calculated target motor input power value. In some embodiments, the actions of block 2102-2110 may be repeated such that the motor may provide constant airflow in the HVAC system throughout operation of the HVAC system. When the power of the motor has been adjusted such that the motor power is approximately equal to the target motor power, the motor power may again be maintained constant to provide constant airflow in the HVAC system.

The schematic flow chart diagrams of FIGS. 8 and 21 are generally set forth as logical flow chart diagrams. As such, the depicted order and labeled steps are indicative of one aspect of the disclosed methods. Other steps and methods may be conceived that are equivalent in function, logic, or effect to one or more steps, or portions thereof, of the illustrated methods. Additionally, the format and symbols employed are provided to explain the logical steps of the methods and are understood not to limit the scope of the methods. Although various arrow types and line types may be employed in the flow chart diagrams, they are understood not to limit the scope of the corresponding methods. Indeed, some arrows or other connectors may be used to indicate only the logical flow of the methods. For instance, an arrow may indicate a waiting or monitoring period of unspecified duration between enumerated steps of the depicted methods. Additionally, the order in which a particular method occurs may or may not strictly adhere to the order of the corresponding steps shown.

Those of skill would appreciate that the various illustrative logical blocks, modules, circuits, and algorithm steps described in connection with the disclosure herein may be implemented as electronic hardware, computer software stored on a computing device and executed by one or more processing devices, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

In some embodiments, the techniques or steps of a method described in connection with the aspects disclosed herein may be embodied directly in hardware, in software executed by a processor, or in a combination of the two. In some aspects of the disclosure, any software module, software layer, or thread described herein may comprise an engine comprising firmware or software and hardware configured to perform aspects of the described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium may be coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

While the aspects of the disclosure described herein have been described with reference to numerous specific details, one of ordinary skill in the art will recognize that the aspects of the disclosure can be embodied in other specific forms without departing from the spirit of the aspects of the disclosure. Thus, one of ordinary skill in the art would understand that the aspects described herein are not to be limited by the foregoing illustrative details, but rather are to be defined by the appended claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for providing constant airflow with a variable speed motor in a Heating, Ventilation, and Air Conditioning (HVAC) system, comprising:
   (a) determining a power and speed of a motor;
   (b) obtaining a target airflow rate for the HVAC system;
   (c) determining a target motor power that yields the target airflow rate in the HVAC system, wherein determining the target motor power comprises calculating the target motor power based on an equation, wherein the equation comprises the target motor power being set to equal a natural exponential function, and wherein an exponent of the natural exponential function is a non-linear higher-order polynomial function of at least the determined speed, the obtained target airflow rate for the HVAC system, and motor operation parameters, and wherein the non-linear higher-order polynomial function includes a product of at least one of:
      the obtained target airflow rate and the determined speed; and
      the determined speed and the determined speed;
   (d) determining whether the determined motor power is approximately equal to the target motor power; and
   (e) adjusting the power of the motor when the motor power is not approximately equal to the target motor power, wherein the motor power is adjusted until the motor power is approximately equal to the target motor power.

2. The method of claim 1, further comprising determining the motor operation parameters based, at least in part, on a minimization of a percent error yielded from the natural exponential function.

3. The method of claim 1, wherein adjusting the power comprises adjusting the speed of the motor when the motor power is not approximately equal to the target motor power until the motor power is approximately equal to the target motor power.

4. The method of claim 1, further comprising maintaining constant the motor power when the motor power is approximately equal to the target motor power.

5. The method of claim 1, further comprising repeating steps (a)-(e) such that the motor provides constant airflow in the HVAC system.

6. The method of claim 1, wherein the motor is a permanent magnet motor.

7. The method of claim 1, wherein the non-linear higher-order polynomial function that is the exponent of the natural exponential function that is set to equal the target motor power comprises the following polynomial:

$$k_0 + k_1 * CFM + k_2 * speed + k_3 * CFM * speed + k_4 * speed^2,$$

wherein speed is the determined speed, CFM is the obtained target airflow rate, and $k_0, k_1, k_2, k_3,$ and $k_4$ are the motor operation parameters.

8. The method of claim 1, wherein the non-linear higher-order polynomial function that is the exponent of the natural exponential function that is set to equal the target motor power comprises five or fewer parameters.

9. An apparatus for providing constant airflow in a Heating, Ventilation, and Air Conditioning (HVAC) system, comprising:
   a variable speed motor; and
   a motor controller coupled to the variable speed motor and configured to control the operation of the variable speed motor, the motor controller comprising a processor configured to perform the steps of:
   (a) determining a power and speed of a motor;
   (b) obtaining a target airflow rate for the HVAC system;
   (c) determining a target motor power that yields the target airflow rate in the HVAC system, wherein determining the target motor power comprises calculating the target motor power based on an equation, wherein the equation comprises the target motor power being set to equal a natural exponential function, and wherein an exponent of the natural exponential function is a non-linear higher-order polynomial function of at least the determined speed, the obtained target airflow rate for the HVAC system, and motor operation parameters, and wherein the non-linear higher-order polynomial function includes a product of at least one of:
      the obtained target airflow rate and the determined speed; and
      the determined speed and the determined speed;
   (d) determining whether the determined motor power is approximately equal to the target motor power; and
   (e) adjusting the power of the motor when the motor power is not approximately equal to the target motor power, wherein the motor power is adjusted until the motor power is approximately equal to the target motor power.

10. The apparatus of claim 9, wherein the processor is further configured to perform the step of determining the motor operation parameters based, at least in part, on a minimization of a percent error yielded from the natural exponential function.

11. The apparatus of claim 9, wherein the processor being configured to perform the step of adjusting the power comprises adjusting the speed of the motor when the motor power is not approximately equal to the target motor power until the motor power is approximately equal to the target motor power.

12. The apparatus of claim 9, wherein the processor is further configured to perform the step of maintaining constant the motor power when the motor power is approximately equal to the target motor power.

13. The apparatus of claim 9, wherein the processor is further configured to perform the step of repeating steps (a)-(e) such that the motor provides constant airflow in the HVAC system.

14. The apparatus of claim 9, wherein the motor is a permanent magnet motor.

15. The apparatus of claim 9, wherein the non-linear higher-order polynomial function that is the exponent of the natural exponential function that is set to equal the target motor power comprises the following polynomial:

$$k_0 + k_1*CFM + k_2*speed + k_3*CFM*speed + k_4*speed^2,$$

wherein speed is the determined speed, CFM is the obtained target airflow rate, and $k_0$, $k_1$, $k_2$, $k_3$, and $k_4$ are the motor operation parameters.

16. The apparatus of claim 9, wherein the non-linear higher-order polynomial function that is the exponent of the natural exponential function that is set to equal the target motor power comprises five or fewer parameters.

* * * * *

UNITED STATES PATENT AND TRADEMARK OFFICE
CERTIFICATE OF CORRECTION

PATENT NO. : 9,732,976 B2
APPLICATION NO. : 14/450962
DATED : August 15, 2017
INVENTOR(S) : Jizhong Wang et al.

It is certified that error appears in the above-identified patent and that said Letters Patent is hereby corrected as shown below:

In the Specification

Column 18, equation 20 reads:
$f(x,y,k) = k_0 + k_1 \cdot CFM + k_2 \cdot speed + k_3 \cdot speed + k_4 \cdot speed^2$ (20)

Correct equation 20 should read:
$f(x,y,k) = k_0 + k_1 \cdot CFM + k_2 \cdot speed + k_3 \cdot CFM \cdot speed + k_4 \cdot speed^2$ (20)

Signed and Sealed this
Seventh Day of November, 2017

Joseph Matal
*Performing the Functions and Duties of the*
*Under Secretary of Commerce for Intellectual Property and*
*Director of the United States Patent and Trademark Office*